United States Patent
Lin

(10) Patent No.: US 9,415,640 B2
(45) Date of Patent: Aug. 16, 2016

(54) VALVE STEM LOCATED CONTROL REGULATOR FOR AN AIR MAINTENANCE TIRE

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 101 days.

(21) Appl. No.: 14/457,388

(22) Filed: Aug. 12, 2014

(65) Prior Publication Data

US 2016/0046157 A1 Feb. 18, 2016

(51) Int. Cl.
*B60C 23/00* (2006.01)
*B60C 23/12* (2006.01)

(52) U.S. Cl.
CPC ............... *B60C 23/004* (2013.01); *B60C 23/12* (2013.01)

(58) Field of Classification Search
CPC ...... B60C 23/10; B60C 23/12; B60C 23/004; B60C 29/02
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 1,682,922 A | 9/1928 | McKone | |
| 2,095,489 A | 9/1935 | Cotton | |
| 3,304,981 A | 2/1967 | Sheppard | |
| 3,833,041 A | 9/1974 | Glad et al. | 152/347 |
| 4,651,792 A * | 3/1987 | Taylor | B60C 23/12 141/198 |
| 4,922,984 A | 5/1990 | Dosjoub et al. | 152/415 |
| 5,052,456 A | 10/1991 | Dosjoub | 152/415 |
| 6,772,812 B1 * | 8/2004 | Hamilton | B60C 23/004 137/224 |
| 7,117,731 B2 | 10/2006 | Hrabal | 73/146 |
| 7,225,845 B2 | 6/2007 | Ellmann | 152/426 |
| 8,042,586 B2 | 10/2011 | Losey et al. | 152/426 |
| 8,113,254 B2 | 2/2012 | Benedict | 152/426 |
| 2009/0294006 A1 | 12/2009 | Hrabal | 152/426 |
| 2010/0243121 A1* | 9/2010 | Eigenbrode | B60C 23/12 152/419 |
| 2012/0234447 A1* | 9/2012 | Narloch | B60C 23/10 152/418 |
| 2014/0000778 A1* | 1/2014 | Gobinath | B60C 23/12 152/450 |
| 2014/0020805 A1 | 1/2014 | Gobinath et al. | 152/450 |

FOREIGN PATENT DOCUMENTS

| | | | |
|---|---|---|---|
| DE | 3433318 | 3/1986 | ............. B60C 23/12 |
| DE | 4323835 A1 | 1/1995 | |

(Continued)

OTHER PUBLICATIONS

Abstract and Translation for German Patent No. 3433318, published Mar. 20, 1986.

(Continued)

*Primary Examiner* — Kip T Kotter
(74) *Attorney, Agent, or Firm* — Edward T. Kennedy

(57) ABSTRACT

A rim mounted control assembly receives therethrough the tire valve stem from an air maintenance tire. A control assembly regulator controls a flow of air to and from a tire-mounted air pumping tube. The control assembly includes a bi-directional air distribution block having multiple parallel air pathways, each air pathway coupled to a respective conduit connected to an air pumping tube mounted within a tire sidewall. The pathways alternatively operate to deliver ambient non-pressurized air to the air pumping tube in response to directional tire rotation against a ground surface.

20 Claims, 30 Drawing Sheets

(56) References Cited

FOREIGN PATENT DOCUMENTS

| | | | | |
|---|---|---|---|---|
| EP | 2868498 A1 | 5/2015 | | |
| RU | 2106978 | 3/1998 | ............. | B60C 23/12 |
| SE | 183890 | 5/1963 | | |
| WO | 03/049958 | 6/2003 | ............. | B60C 23/12 |
| WO | 2005/012009 | 2/2005 | ............. | B60C 23/00 |
| WO | 2007/134556 | 11/2007 | ............. | B60C 15/24 |
| WO | 2010/008338 | 1/2010 | ............. | B60C 23/00 |
| WO | WO2010008338 A1 | 2/2010 | | |

OTHER PUBLICATIONS

Abstract for Russian Patent No. 2106978, published Mar. 20, 1998.
Abstract for Swedish Patent No. 183890, published May 21, 1963.
European Search report received by Applicant Dec. 8, 2015.

* cited by examiner

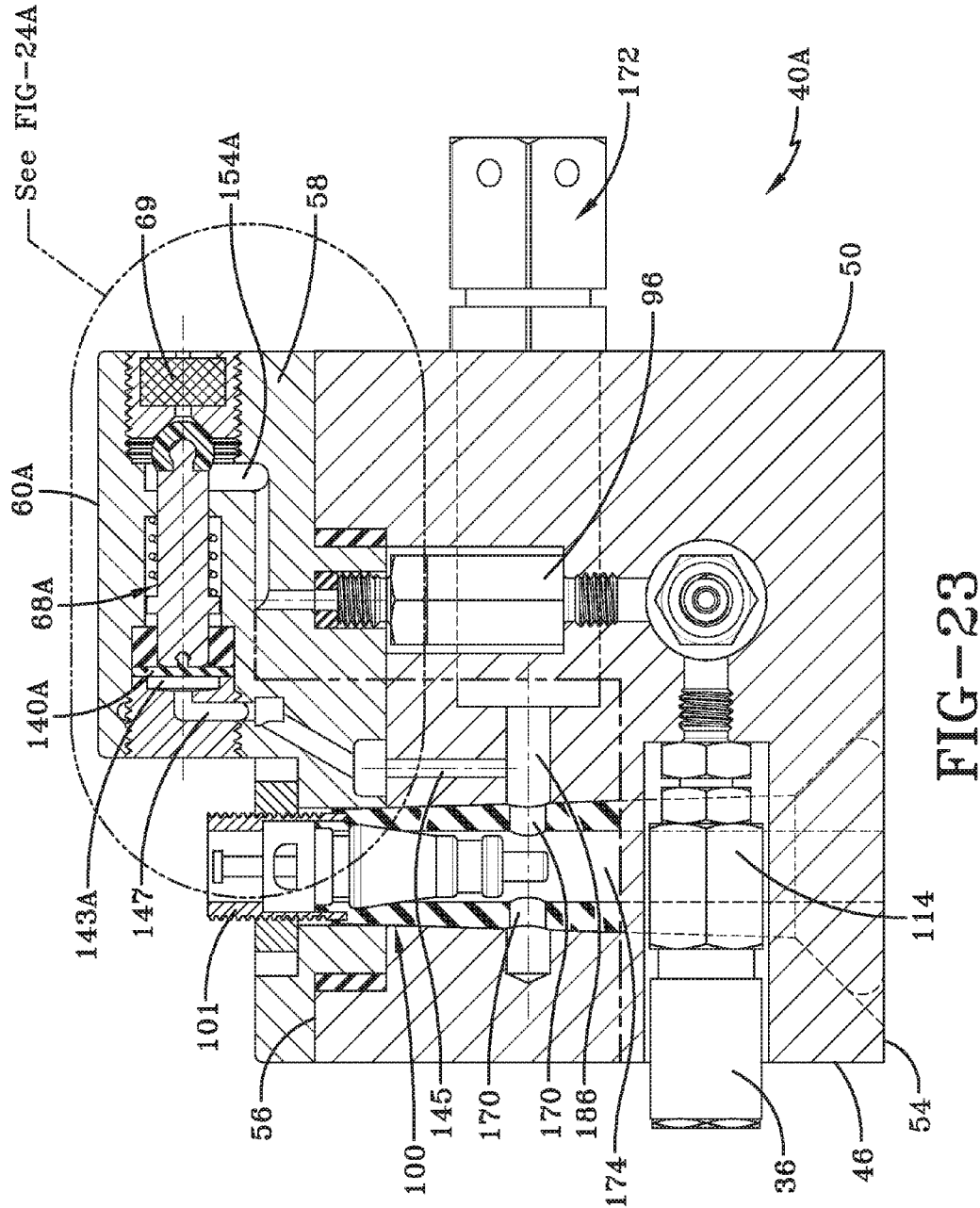

VALVE STEM LOCATED CONTROL REGULATOR FOR AN AIR MAINTENANCE TIRE

FIELD OF THE INVENTION

The invention relates generally to air maintenance tires and, more specifically, to a control and air pumping system for use in an air maintenance tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependent upon the driver taking remedial action when warned to re-inflate a tire to recommended pressure. It is a desirable, therefore, to incorporate an air maintenance feature within a tire that will self-maintain the tire air pressure in order to compensate for any reduction in tire pressure over time without a need for driver intervention.

SUMMARY OF THE INVENTION

According to an aspect of the invention, a control valve assembly proximally mounts to a tire valve stem and operably controls a flow of pressurized air through the tire valve stem from either an external pressurized air source or an ancillary tire-mounted pressurized air source mounted within a tire sidewall. The control assembly includes a bi-directional air distribution block having a plurality of air pathways, each air pathway coupled to a respective conduit connected to a tire-mounted air pumping tube. The pathways alternatively operate to deliver ambient non-pressurized air to the air pumping tube in response to the direction of tire rotation against a ground surface.

In another aspect, each of the air pathways comprises multiple check valves serially connected within the air distribution block, the check valves within each pathway selectively opening and closing in response to the direction of tire rotation against a ground surface.

According to another aspect, the pressure control assembly includes a relief valve mounted to vent pressurized air from the air pathways through the bi-directional block. The relief valve operably opens to vent pressurized air when an air pressure within the tire cavity is at or above a predetermined optimal inflation level, and the relief valve operably closes when air pressure within the tire cavity is below the predetermined optimal inflation level.

In another aspect, the pressure control assembly controls pressurized air flow from the pumping tube by controlling the flow of ambient non-pressurized air to the tire-mounted tube responsive to a detected air pressure level within the tire cavity.

Pursuant to another aspect, the valve stem is sized and configured to extend through a rim body and the bi-directional air distribution block. The pressure control assembly mounts to a surface of the rim body at the control location in proximal relationship with the valve stem.

The air pumping tube, in another aspect, mounts within a flexing region of a tire wall closes and opens segment by segment in reaction to induced forces from the tire flexing region as the flexing region of the tire wall rotates opposite a rolling tire footprint.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Duck Valve" is a check valve manufactured from rubber or synthetic elastomer, and shaped like the beak of a duck. One end of the valve is stretched over the outlet of a supply line, conforming itself to the shape of the line. The other end, the duckbill, retains its natural flattened shape. When pressurized air is pumped from the supply line through the duckbill, the flattened end opens to permit the pressurized air to pass. When pressure is removed, the duckbill end returns to its flattened shape, preventing backflow.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Inward" directionally means toward the tire cavity.

"Lateral" means an axial direction.

"Lateral edges" means a line tangent to the axially outer-most tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Outward" directionally means in a direction away from the tire cavity.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 23 is a cross sectional view through the assembled regulator and bi-directional block.

DETAILED DESCRIPTION OF THE INVENTION

Figure 1:
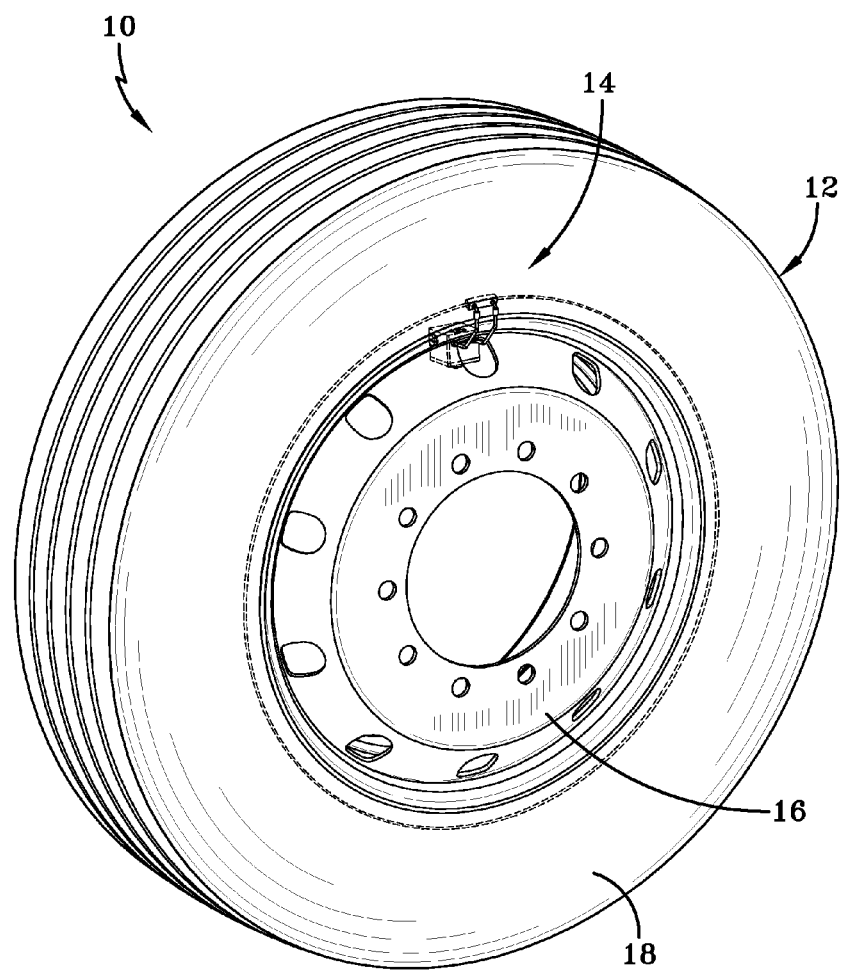
FIG. 1 is a perspective view of a tire with a valve stem mounted bi-directional AMT pressure control system.

Referring to FIGS. 1, 2, 3 and 4, a tire assembly 10 includes a tire 12, a control system 14 for controlling a peristaltic pump assembly 15, and a tire rim body 16. The tire mounts in conventional fashion to the rim body 16. The tire is of conventional construction, having a pair of sidewalls 18, 20 (only sidewall 18 being shown) extending from opposite bead areas 22, 24 (only bead area 22 being shown) to a crown or tire tread region 26. The tire and rim body enclose a tire cavity 28 (see FIG. 5).

Figure 2:
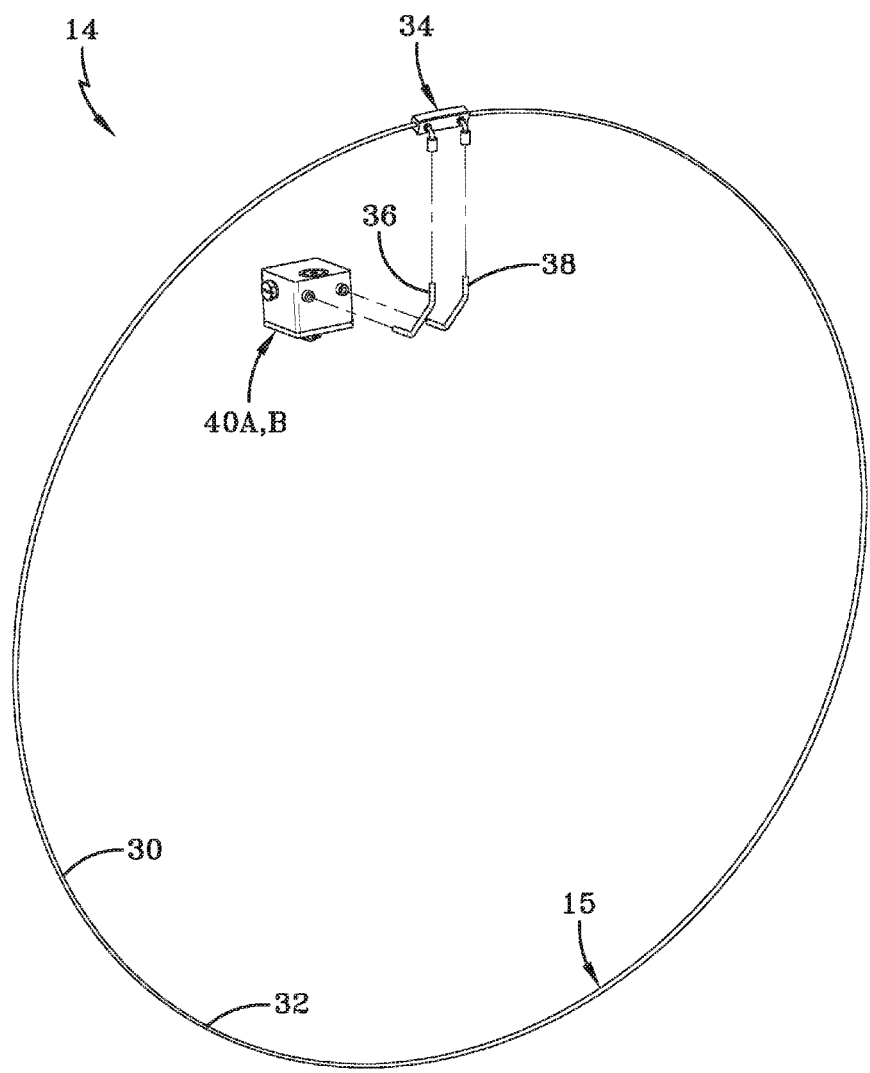
FIG. 2 is an exploded perspective view of the stem mounted bi-directional AMT pressure control system.
Figure 3:
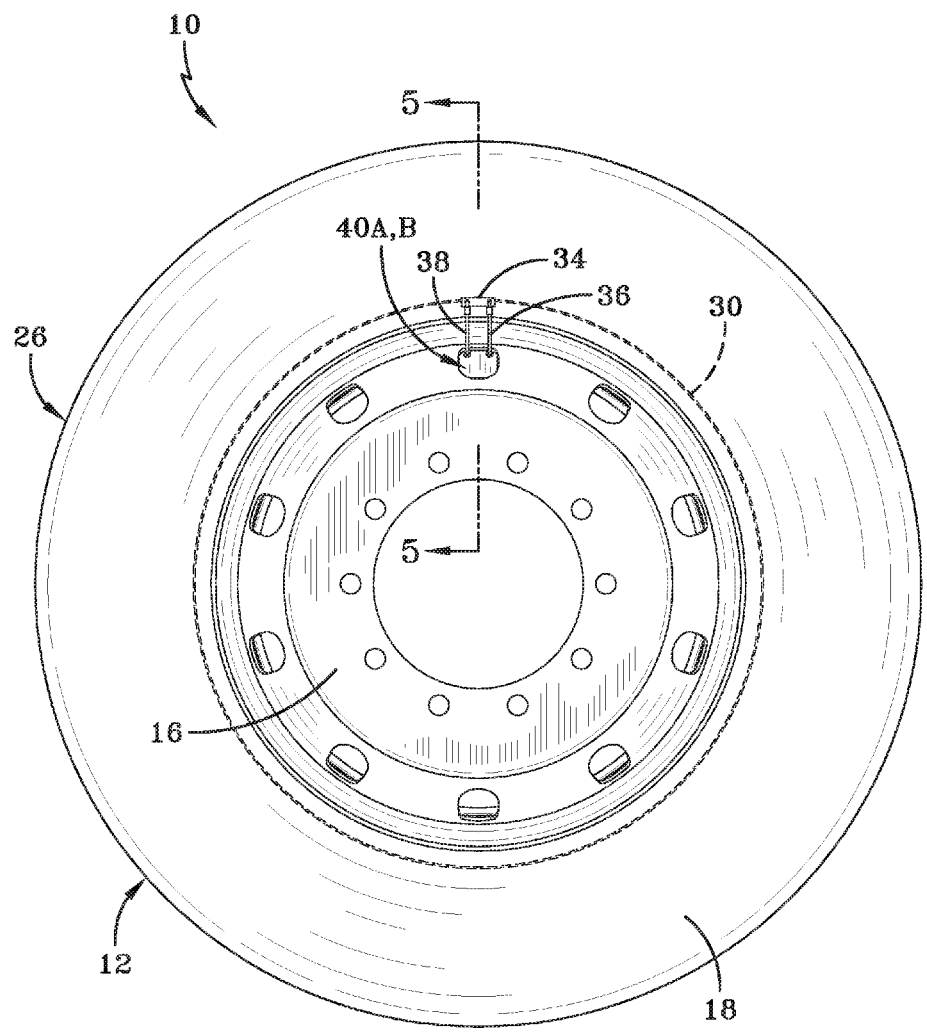
FIG. 3 is a side view of the tire with the valve stem mounted bi-directional AMT pressure control system.

As seen from FIGS. 2 and 3, the peristaltic pump assembly 15 includes an annular air tube 30 that encloses an annular passageway 32. The tube 30 is formed of a resilient, flexible material such as plastic or rubber compounds that are capable of withstanding repeated deformation cycles. So constructed, the tube may deform within a tire into a flattened condition subject to external force and, upon removal of such force, return to an original sectional configuration. In the embodiment shown, the cross-section of the tube in an unstressed state is generally circular but other alternative tube geometries may be employed if desired. The tube is of a diameter sufficient to operatively pass a requisite volume of air sufficient for the purpose of pumping air into the tire cavity 28 to maintain the tire 12 at a preferred inflation pressure.

Figure 4:
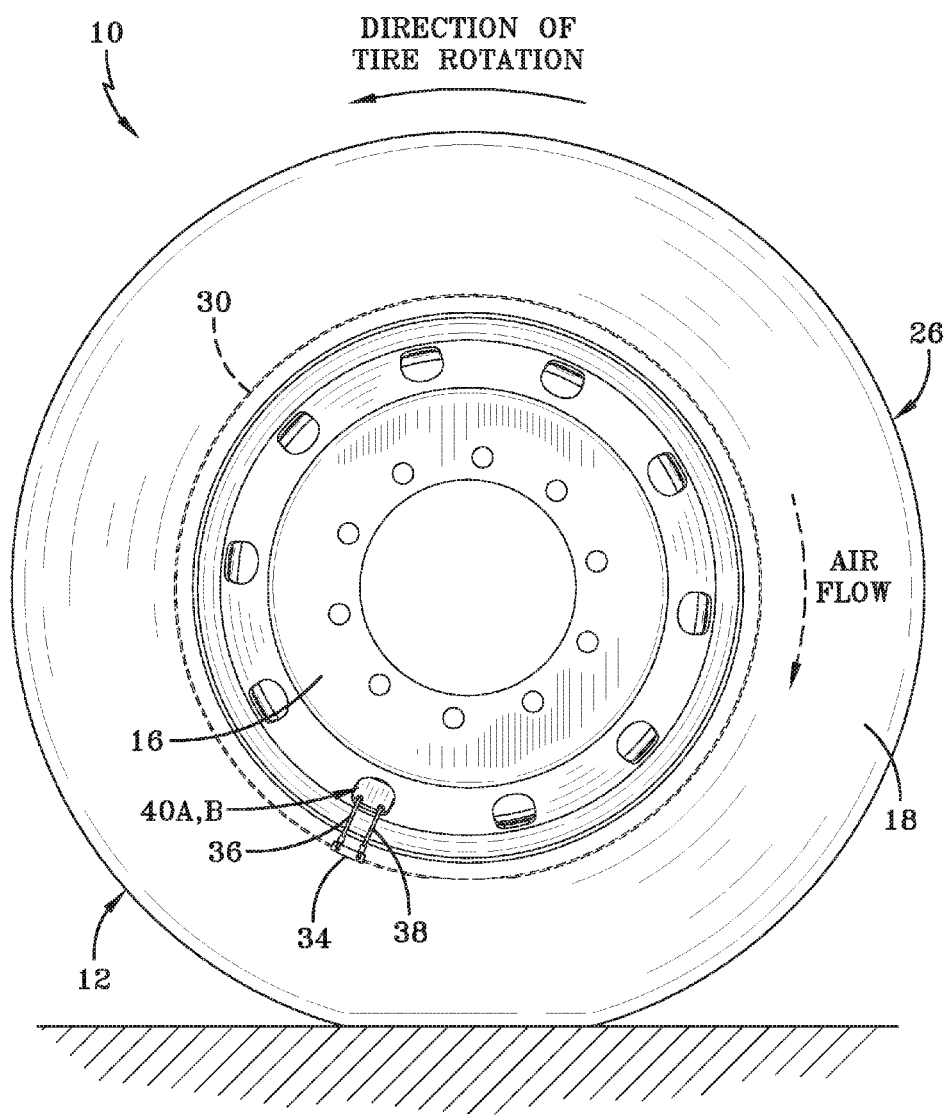
FIG. 4 is a side view of the tire with the valve stem mounted bi-directional AMT pressure control system showing the pump tube closed from contact with the road forcing air flow.

The peristaltic principles of incorporating a deformable air tube within a tire are shown and described in U.S. Pat. No. 8,113,254, incorporated herein by reference in its entirety. In the patented system, the tube is incorporated within an annular tire passageway formed within the tire proximate a tire bead region. As the tire rotates air from outside the tire is admitted into the tube and pumped along the air tube by the progressive squeezing of the tube within the tire as the tire rotates. Air is thus forced into an outlet valve and therefrom into the tire cavity to maintain air pressure within the tire cavity at a desired pressure level. FIG. 4 shows the general operational principle of the air tube pumping an air flow along the tube as the tire rotates against a ground surface.

The tube 30 mounts closely within a groove in the tire and sequentially flattens as the tire rotates. The segment by segment flattening of the tube as the tire rotates operates to pump air along the air passageway 32, air which is then directed into the tire cavity 28 to maintain air pressure. A peristaltic pumping system employing a tube within a sidewall groove is shown in issued U.S. Pat. No. 8,042,586, also incorporated herein by reference in its entirety.

Figure 5:
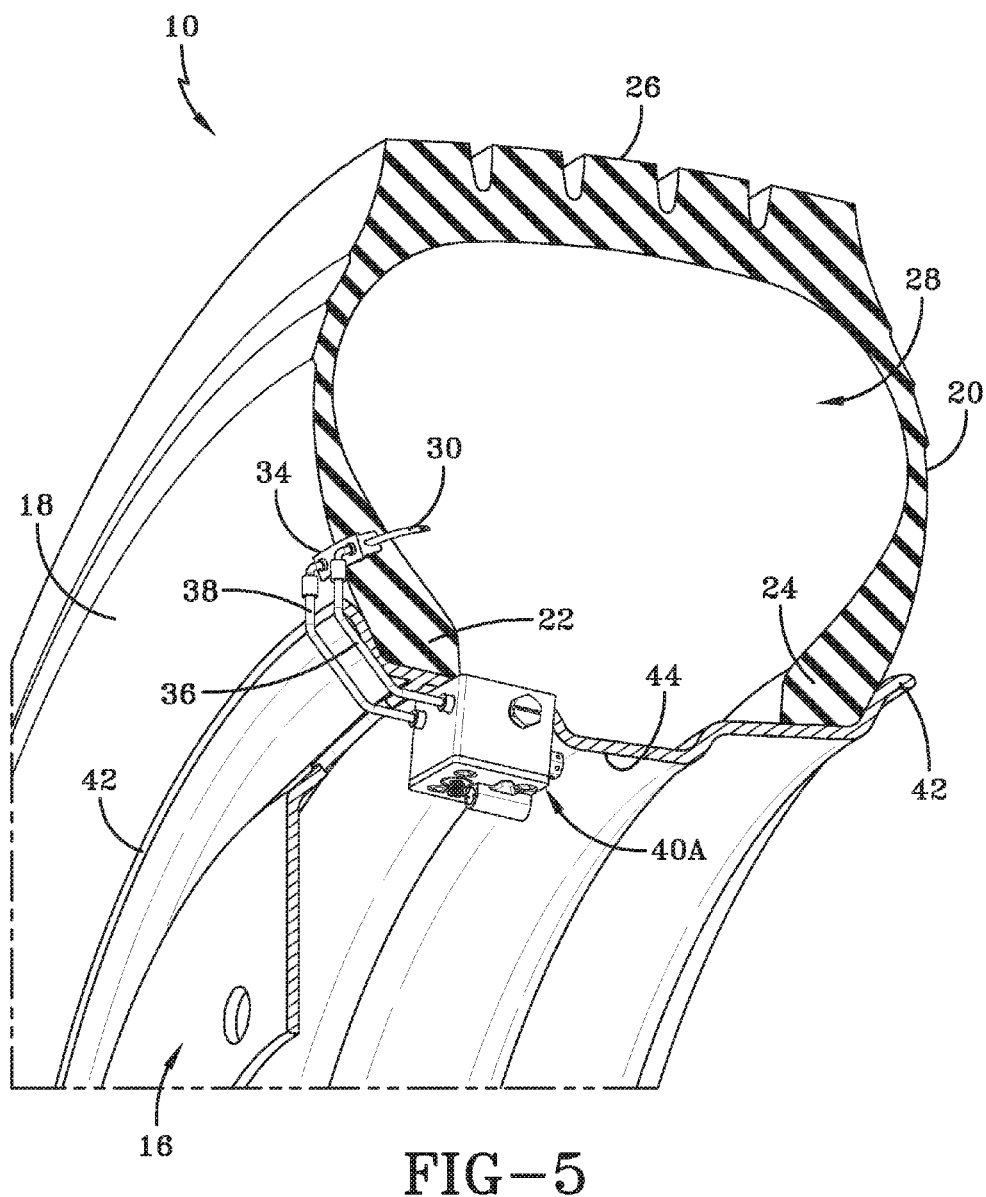
FIG. 5 is a partial section perspective view from FIG. 3 of a first embodiment of the stem mounted bi-directional AMT pressure control system.
Figure 6A:
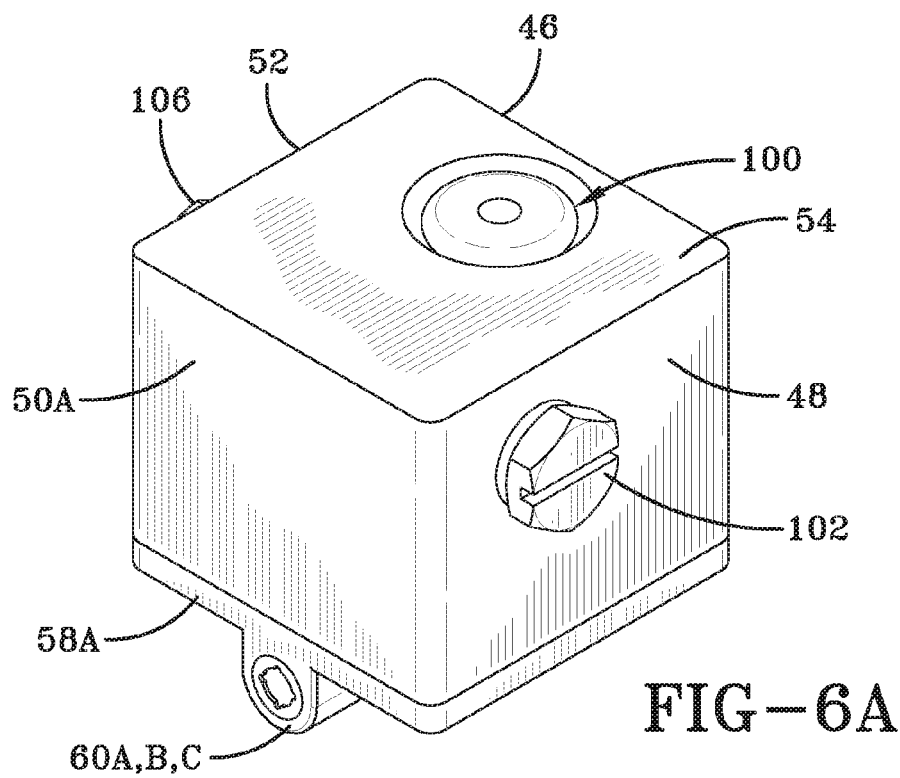
FIG. 6A is a perspective view of the stem mounted bi-directional AMT pressure control system.
Figure 6B:
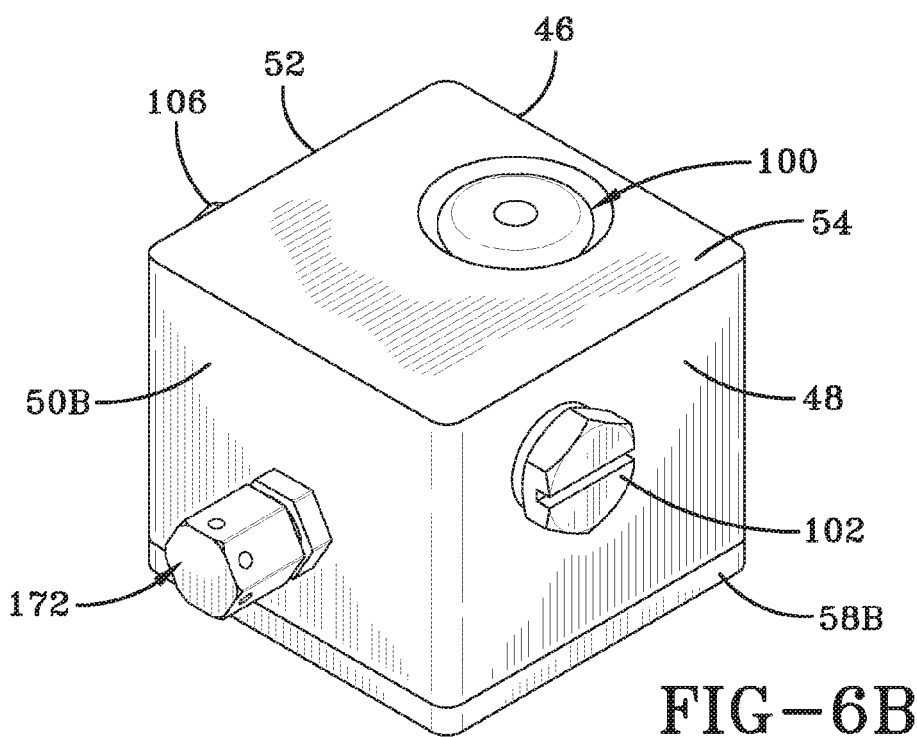
FIG. 6B is an opposite side perspective view of the pressure control system.
Figure 7:
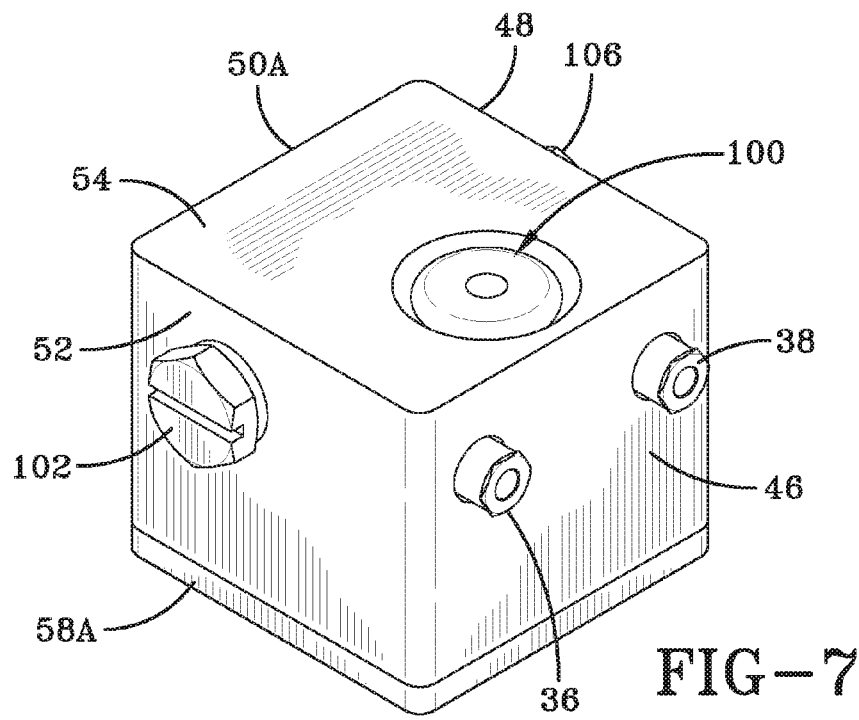
FIG. 7 is an alternate angle perspective view of the stem mounted bi-directional AMT pressure control system.
Figure 8:
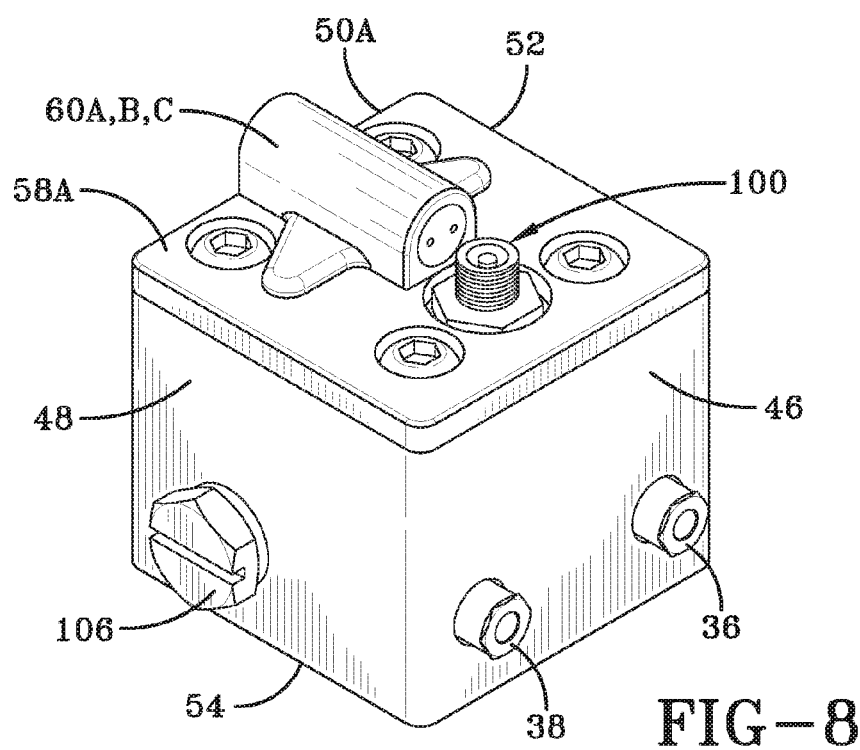
FIG. 8 is an opposite side perspective view of the stem mounted bi-directional AMT pressure control system.

Referring to FIGS. 2, 4, and 5, the pump tube 30 is generally annular and circumscribes a lower tire sidewall 18 region proximate to a bead region 22. However, other configurations for the air tube may be devised without departing from the invention. Opposite ends of the tube 30 connect into an inline connector block 34. Conduits 36 and 38 are coupled to the connector block 34 and to respective opposite ends of the pumping tube. The conduits 36, 38 follow a predetermined path around a rim flange 42 to the air flow bi-directional block 40A, B affixed to an underside 44 of the rim body 16. Conduits 36, 38 represent air inlet/outlet channels to and from the air pumping tube 30. In the pumping mode, forward revolution of the tire, one conduit delivers air to the pumping tube and the other conduit conducts air pressurized by the pumping tube to the bi-directional block 40A, B. In the reverse rotational direction of the tire, the conduits 36, 38 functionally reverse.

FIGS. 5, 6A, 7, 8, 9A, 10A, and 11A show a first embodiment for a control regulator/bi-directional block set up. The control valve regulator uses a cold set inflation control of inlet air into the air tube 30. In such a system, the air tube will not be pumping air when the control system valve is in the off or closed position (no air input into tube) and will only operate to pump air when the control valve is in the on or open condition (air flow into tube). In the cold set control regulator, a spring regulated actuator with pressure sensing capability is used to open and close air flow to the tube 30. If cavity pressure is less than set pressure (cold inflation set pressure), the regulator valve opens and allow air into the air tube 30. If cavity pressure is higher than set pressure (cold inflation set pressure), the regulator valve will close and no air will be allowed to flow into the tube 30. Three designs for a cold set regulator valve are shown in FIGS. 12A through 14B.

An alternative second embodiment of a control regulator/block set up is shown in FIGS. 6B, 9B, 10B and 11B. In the second embodiment control regulator approach, outlet pressurized air from the pumping tube is controlled by a spring regulated pressure relief valve, rather than an air inlet control regulator valve system. Setting the relief valve controls the flow of air from the pumping air tube 30 into the tire cavity 28. If the cavity pressure is less than set pressure (ceiling inflation set pressure), the valve opens and allows air into the tire cavity when built-up air pressure in the pump tube is higher than the pressure in the tire cavity. If the cavity pressure is higher than set pressure (ceiling inflation set pressure), the pumped air will release through the relief valve and either bypass back into the pump or release to atmosphere.

In both the first and second control regulator/block set up configurations, a pumping of air from the tube 30 to the tire cavity can occur when the tire is rotating in either a forward or reverse direction. The bi-directionality in pumping air from the tube 30 is made possible by an air flow bi-directional block 40A, B containing dual air flow paths, each path defined by a coupled pair of check valves. The four check valves within the dual parallel air flow paths may be augmented by a fifth check valve for extra control. Thus, the control system 14 employed in the subject invention may be configured as an inlet air control system employing an inlet control regulator or an outlet pressurized air control system, both the inlet and outlet systems using a bi-directional air distribution block 40 A, B.

Figure 26:
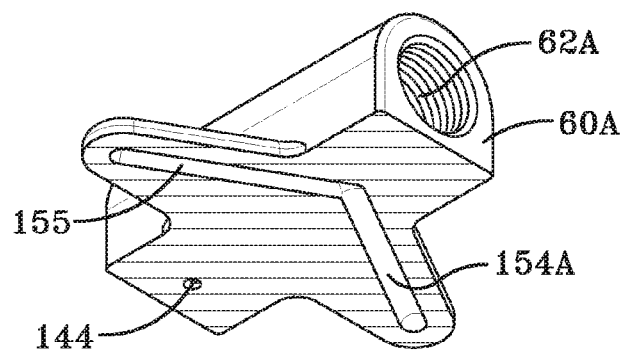
FIG. 26 is a bottom perspective view of the regulator valve housing component of the regulator cover plate.
Figure 27:
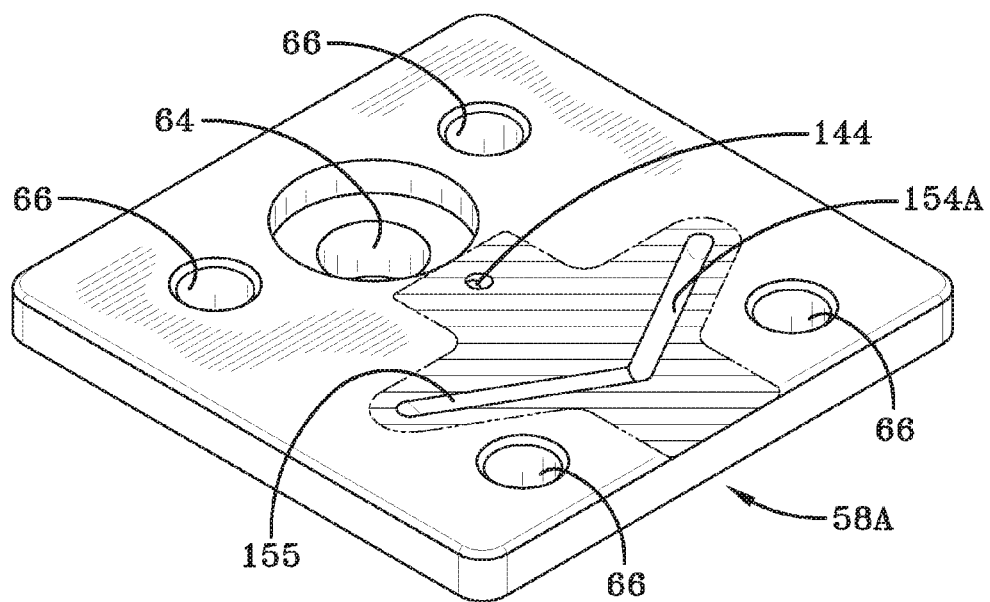
FIG. 27 is a top perspective view of the regulator cover plate with the regulator valve housing removed.

With reference to FIGS. 5, 6A, 7, 8, 9A, 10A, and 11A, 25, 26, 27, the air flow directional block 40A is generally a cubic body formed by sidewalls 46, 48, 50A, B, 52, bottom wall 54 and a top side 56. A top cover plate 58A attaches over the top side 56 of the cubic body and the control regulator 68A. An elongate cylindrical control regulator valve housing 60A is attached to an outward surface of the top cover plate 58A by suitable means, the housing 60A having an axial through bore 62. The cover plate 58A is formed having a circular through bore 64 sized to accept a protruding tire valve stem as explained below. A set of four corner assembly apertures 66 extend through the top panel. As seen in FIGS. 26 and 27, deformations forming part of the control assembly outlet air passageways 154A, 155 extend along the underside of the housing 60A. Complementary deformations are formed within and extend along the upper surface of the top cover plate 58A. When united, the deformations form the enclosed outlet air passageways 154A, 155. Attachment of the housing 60A to the cover plate 58A completes the formation of the passageways 154A, 155, whereby providing parallel outlet air passageways from the control assembly housed within the housing 60A to the bi-directional distribution block 40A.

A control valve assembly 68A, C, also referred herein as the "control regulator", in each of three alternative embodiments described herein is housed within the bore 62 within cylindrical control regulator housing 60A. A recess 70 is defined within the top side 56 of the cubic body of block 40A, B. The top side 56 further is formed to provide four corner assembly sockets 72 and a through bore 74 dimensioned to accept a tire valve stem 100 therethrough. A pair of duck valve-seating sockets 76, 78 extend into the top side 56 at opposite corners of the air collection chamber 70.

Four assembly pins 80 extend through the apertures 66 and into the sockets 72 to affix the cover plate 58A, B to the top side 56 of the block 40A, B, whereby enclosing the air collection chamber 70. A valve-stem attachment nut 82 is provided for securing a tire valve stem 100 to the block 40A, B. A pair of duck valve sockets 84, 86 (valve 86 not shown in FIG. 9A) extend through the block sides 48, 52, respectively. A pair of air inlet/outlet sockets 88, 90 extend through the block side 46 positioned in spaced apart relationship as shown. The duck, or "check" valves 92, 94, 96, 98 are of a commercially available type, also referred herein as "check" valves. Duck valve components 92, 94 extend transversely into the bi-directional block 40A, B, residing respectively within sockets 84, 86, and duck valve components 96, 98 extend vertically into the block 40A, B, residing respectively within sockets 76, 78. The valve components 92, 98 and the valve components 94, 96 are paired to create two parallel air flow paths through the block 40A, B, providing dual paths from the control regulator 68A to the inlet/outlet sockets 90, 88 respectively. The valves are configured conventionally as duck-bill valves that include a slitted membrane that opens and closes responsive to application of air pressure. Other known types of check valves may be used if desired. Outward ends 99 of the duck valves 96, 98 are coupled to the control valve assembly 68A by the formed pair of outlet conduits 154A, 155 to create the two parallel air flow paths conducting air from the control valve assembly 68A to the bi-directional block 40A, B.

A valve stem 100 of the tire is internally modified to provide an internal pressurized air collection chamber 174 at a base end. The internal air collection chamber 174 of the valve stem is accessible by a transverse inlet passageway 170 extending through the valve stem. The valve stem 100 is received and projects from through-bore 64 of the block 40A, B. The valve stem 100 has an axially outward screw threaded end housing a valve component 101 of conventional configuration. The valve component within end 101 is used to input pressurized air sourced from an external air input through the valve stem and into the tire cavity. As used herein, the valve (not shown) housed within end 101 of the valve stem 100 is referred to as a "primary input valve". The primary input valve admits pressurized air in conventional fashion from a primary pressurized air external source (not shown) into the air collection chamber 174. From the air collection chamber 174 the pressurized air from the primary pressurized air external source is directed into the tire air cavity 28 to re-pressurize the cavity.

The delivery of pressurized air to the tire cavity pursuant to the invention thus may be secured from dual sources The primary input valve within valve stem end 101 conventionally admits pressurized air from a primary external air source. In addition and complementary therewith, the air pumping tube 30 pressurizes the cavity 28 under the control of regulator 68A on an as needed basis as the tire rolls against a ground surface.

The coupling nut 82 affixes to the external screw threads of a protruding end 101 of the valve stem 100 to secure the valve stem to the block 40A, B. A screw-in plug 102 and sealing O-ring 104 inserts into the valve socket 86 to secure the valve 94 in position. Likewise, screw-in plug 106 and sealing O-ring 180 engages into the socket 84 to secure the valve 92 within the block 40A, B. The air inlet/outlet conduits 36, 38 include end fittings 110, 112 that couple to connectors 114, 116 within the inlet/outlet sockets 88, 90 of the block 40A, B, respectively. So coupled, both of the inlet/outlet conduits are enabled to conduct air from the block 40A, B to the air tube 30 and conduct pressurized air from the air tube 30 back to the block. Inlet and outlet functions switch back and forth between the conduits 36, 38 as dictated by the direction of tire rotation. The pumping tube 30 is thus capable of delivering pressurized air through the block 40A, B to the tire cavity with the tire 12 rotating in either a forward or a reverse direction. An internally threaded access opening 122 through the bottom floor of the air collection chamber 70 is used in the assembly of the block 40A, B. Once assembly is completed, screw 120 is screw threaded attached into the access opening 122 to seal off the interior of the block 40 for its intended air distribution operation.

Figure 9A:
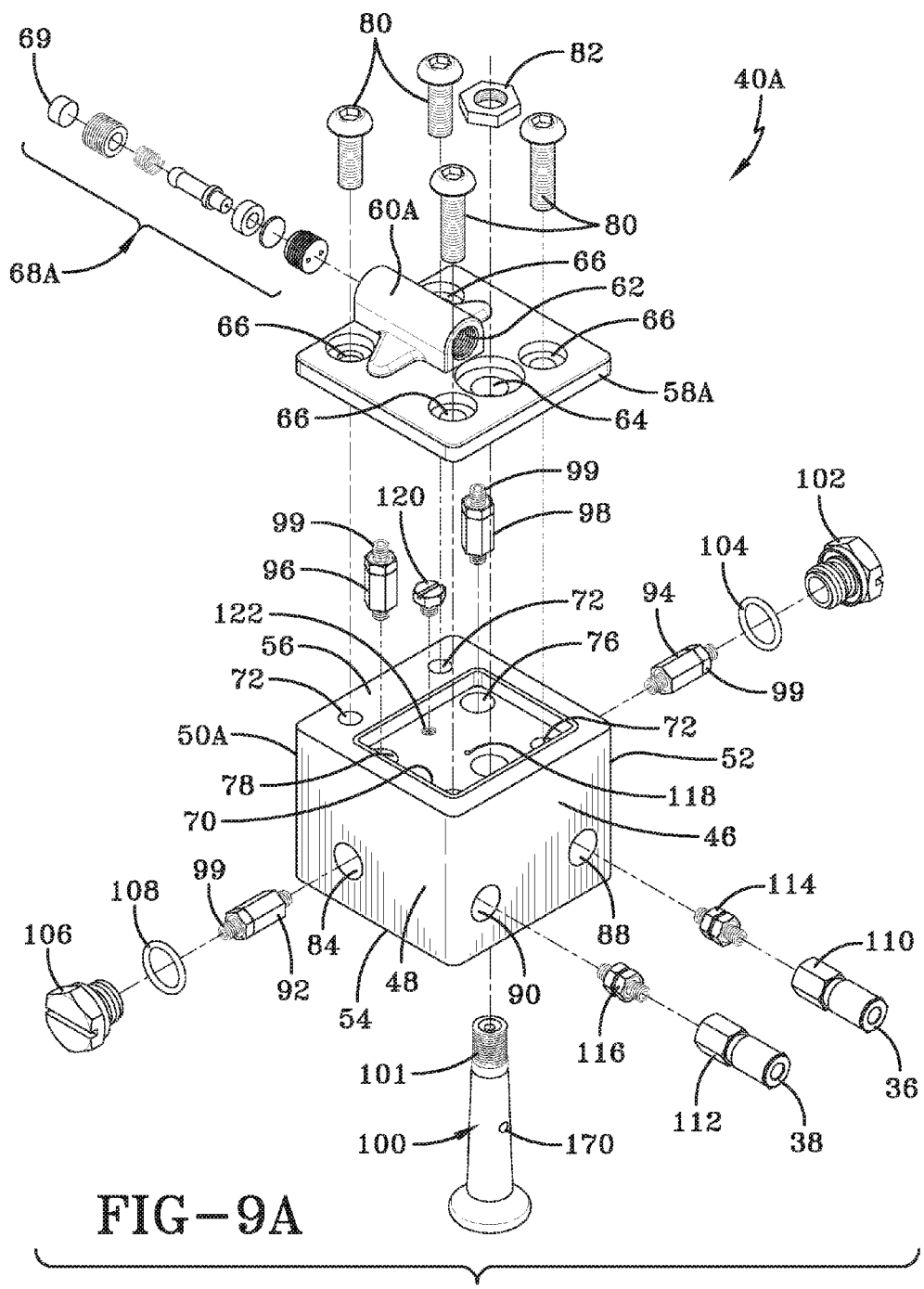
FIG. 9A is an exploded perspective view of the first embodiment of the stem mounted bi-directional AMT pressure control system.
Figure 11A:
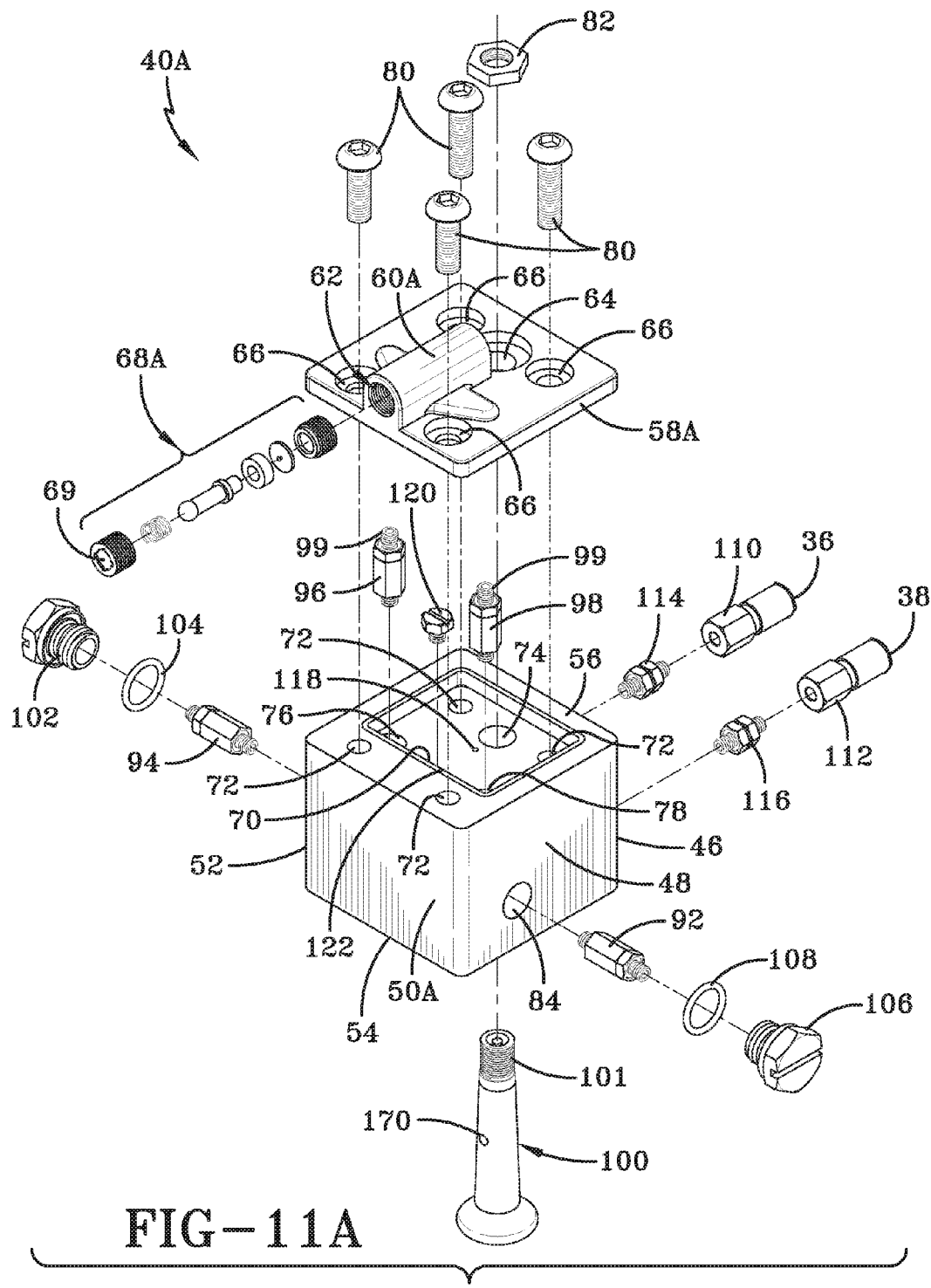
FIG. 11A is an opposite angle to FIG. 9A exploded perspective view of the first embodiment of the stem mounted bi-directional AMT pressure control system.
Figure 24A:
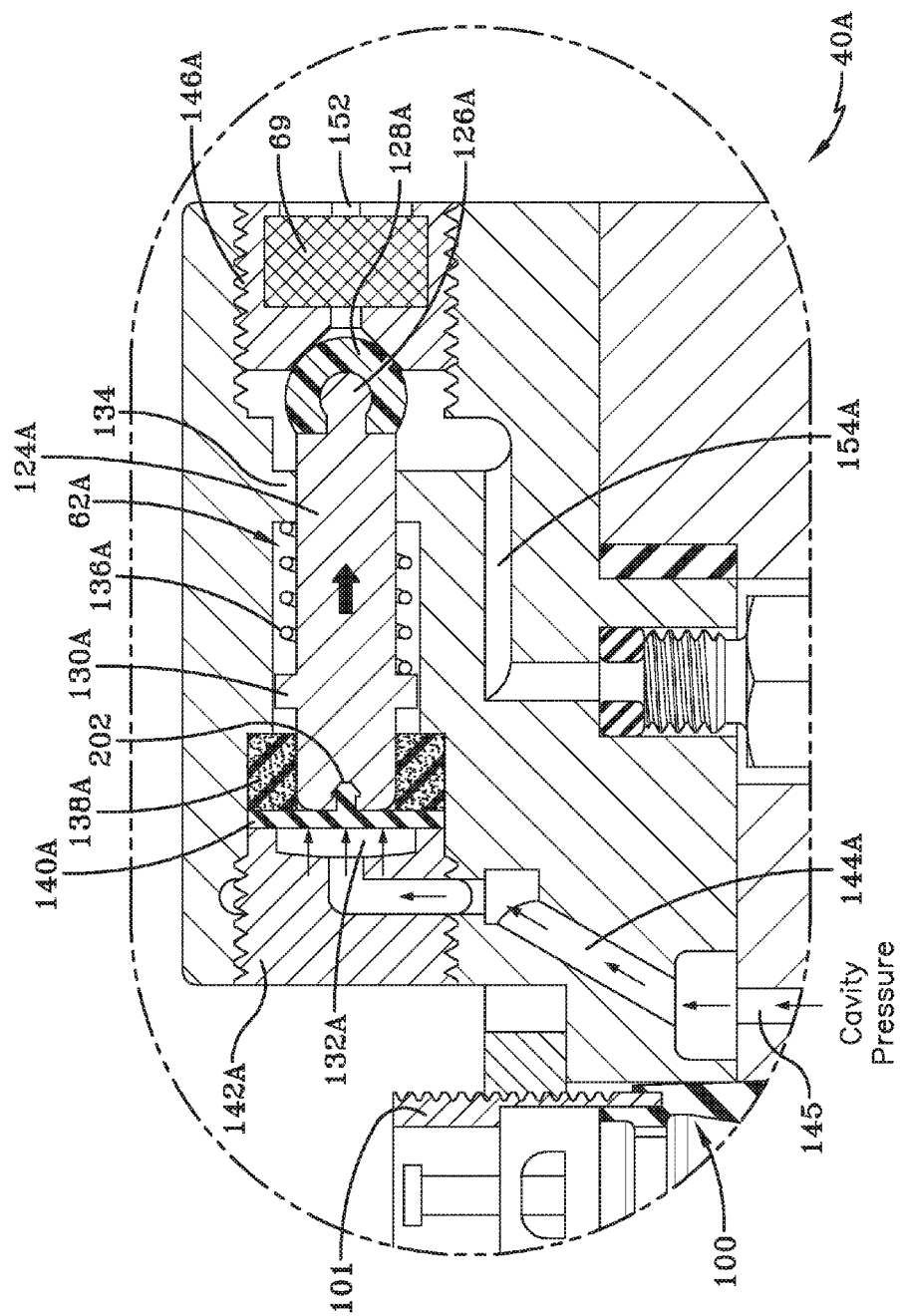
FIG. 24A is a sectional schematic view through the assembled regulator and bi-directional block showing the regulator valve in the closed position
Figure 24B:
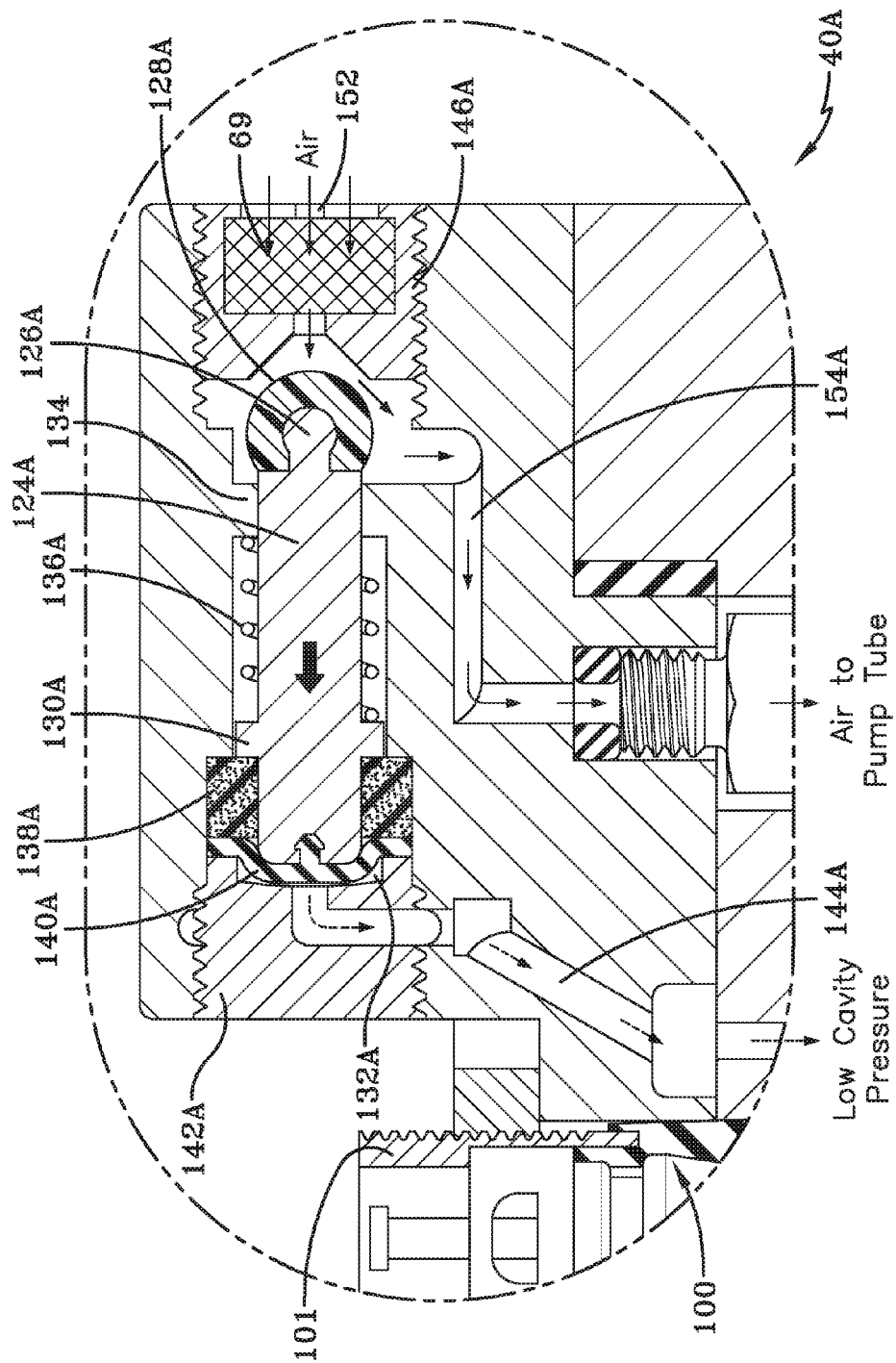
FIG. 24B is a sectional schematic view through the assembled regulator and bi-directional block showing the regulator valve in the open position.
Figure 25:
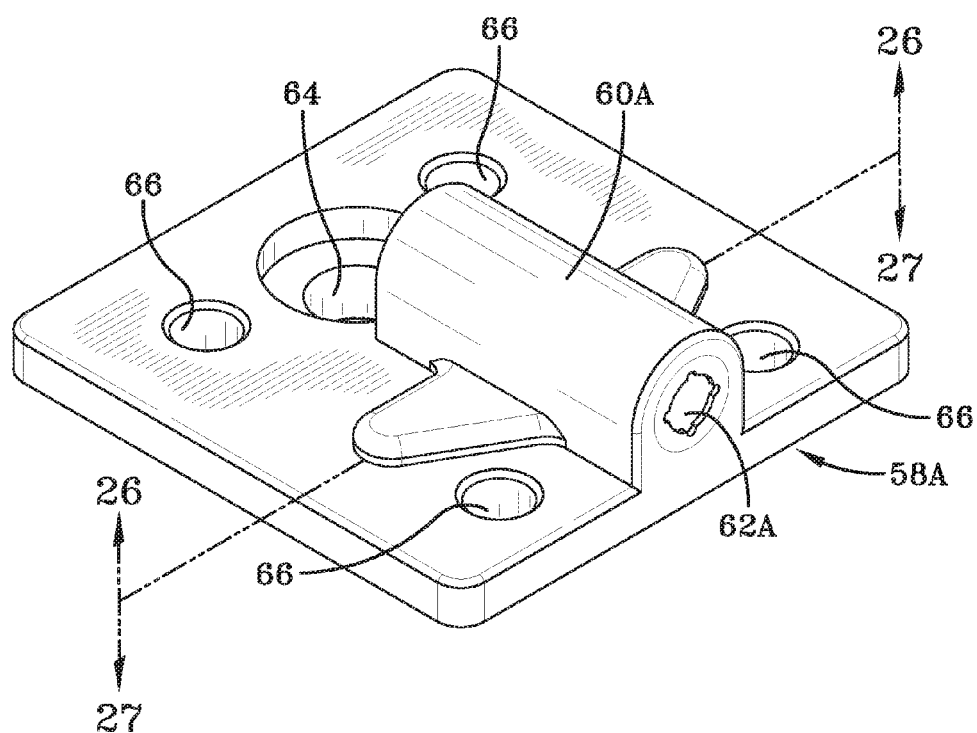
FIG. 25 is a top perspective view of the regulator cover plate.

FIG. 11A shows the FIG. 9A assembly described above from a reverse angle and FIG. 10A shows the assembled control assembly bi-directional block 40A. FIGS. 12A and 12B and FIGS. 24A and 24B are sectional schematic views of the control regulator 68A in the closed and open positions, respectively. FIG. 23 shows a sectional view through the assembled control valve assembly 68A and bi-directional block 40A. FIG. 24A shows an enlarged view of the control regulator 68A of FIG. 23 in the closed position. FIG. 24B shows the enlarged view of the control regulator 68A in the open position. The embodiment of FIGS. 9A, 12A, 12B, 23, 24A and 24B represents a first one of three alternative embodiments of the stem mounted bi-directional AMT pressure control system disclosed herein. Control valve assembly 68A, mounted to the block 40A controls air flow into the block 40A and, hence, the air tube 30 (FIG. 5). A cold set inflation level is applied to the assembly 68A to control opening and closing of the valve assembly and, thereby, air flow to the air pumping tube. Three alternative configurations of the control valve assembly 68A are shown in FIGS. 12 through 14 and described below.

With reference to FIGS. 9A, 12A, 12B, 23, 24A, 24B, a first cold set inflation control regulator embodiment 68A is shown suitable for assembly into longitudinal bore 62 of the control regulator housing 60A. The control regulator of FIGS. 24A, 24B includes a filter element 69 in the assembly whereas the simplified assembly of FIG. 12A, 12B does not.

Valve Closed Position

Figure 12A:
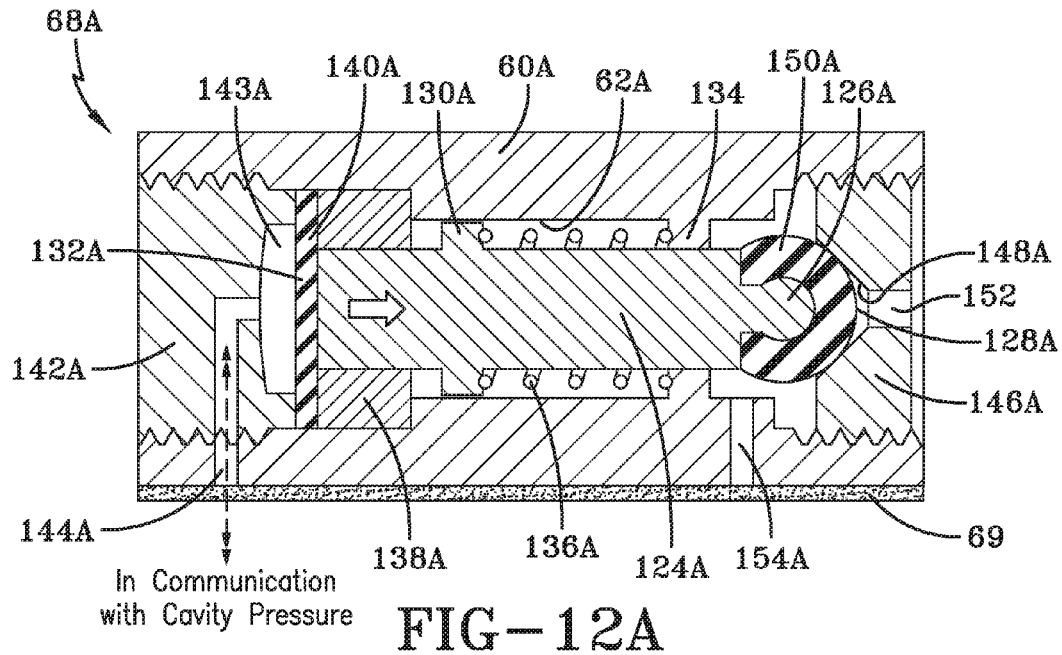
FIG. 12A is a section view of a first cold set inflation control regulator embodiment with the tire cavity pressure above the set pressure, not allowing air to pass.
Figure 12B:
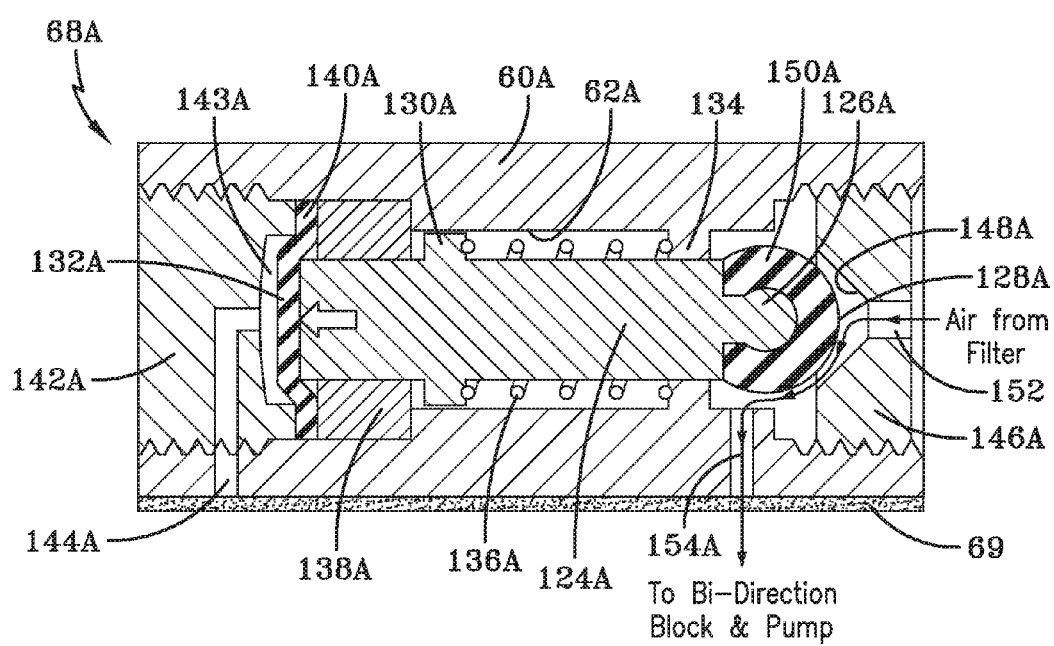
FIG. 12B is a section view of the first cold set inflation control regulator embodiment with the tire cavity pressure below the set pressure, allowing air to pass.

As shown in FIGS. 12A and 24A, the regulator is in the closed position with the tire cavity pressure above the set pressure, not allowing air to pass. The assembly 68A includes an elongate actuator piston 124A having a spherical nose 126A at a forward end 128A; an annular flange 130A disposed toward a rearward end 132A. An annular spring stop flange 134 extends into the center bore 62A toward a forward end of the bore 62A. A coil spring 136A encircles the piston 124A, positioned between the annular flange 130A and the stop flange 134. An annular diaphragm plug 138A has a through-hole receiving a rearward end portion of the piston 124A within a rearward region of the housing bore. The plug 138A functions as a guide for reciprocal axial movement of the piston 124A. A generally circular flexible diaphragm component 140A is positioned to the rear of the guide plug 138A within the bore 62A. The diaphragm component 140A is formed of resilient elastomeric material capable of deformation when subject to pressure against an outward surface and resumption of an original configuration when that pressure is removed or lessened. Diaphragm component 140A includes a protruding finger 202 that is captured and secured within the piston 124A. Deformation of the diaphragm component 140A as shown operatively moves the piston 124A axially into a closed, seated position. A threaded insert 142A screws into a rearward end of the housing 60A and encloses the assembly within bore 62A. The insert 142A has a centrally disposed pressure sensing cavity 143A positioned adjacent the outward surface of diaphragm component 140A. A tubular conduit 144A connects the cavity 143A to a passageway 145 extending through block 40A. The passageway 145 communicates with the tire cavity to convey tire cavity pressure to the cavity 143A located opposite the outward surface of the diaphragm component 140A.

At the forward end of the housing 60A a set pressure adjustable threaded filter insert 146A is threaded into the housing, closing the bore 62A. The extent to which the screw 146A is screwed in will determine the compression force in coil spring 136. The insert 146A is configured forming a seat or pocket 148A positioned opposite the spherical nose 126A of the piston 124A. The spherical nose 126A of the piston 124A is fitted with a cover 150A formed of elastomeric material composition for sealing purposes. The screw 146A has an axial air inlet channel 152 extending therein from the forward end in communication with the seat 148A. In the configuration of FIGS. 24A and 24B, a filter element 69 is disposed within the air inlet channel 152. A pair of spaced apart air outlets 154A 155 (one of which being shown in the sectional views) are positioned as outlets from the body 60A and extend in air flow communication with the inlet channel 152 when the piston 124A is in the open or unseated position.

It will be appreciated that the piston 124A axially moves reciprocally within the control regulator body 60A. In the forward, "valve closed", location shown by FIGS. 12A and 24A, the spherical nose 126A of the rod 124A seats against the seat 148A and blocks off air flow from the air inlet channel 152 into the body bore 62A. Air is therefore blocked from the pair of air outlets 154A, 155 to the bi-directional block 40A. Screw adjustment of the adjustable screw 146A inward or outward sets the compression force exerted by the spring and thereby dictates the air pressure against the outward surface of the diaphragm component 140A required to overcome this preset spring bias.

Valve Open Position

A high tire cavity pressure level presented by the passageway 144A causes the diaphragm 140A to push against the piston rod 124A with sufficient force to overcome spring bias force and maintain the piston in its seated or "closed" position. The piston 142A is pressured against seat 148A whenever air pressure within the tire cavity is at or above rated pressure level. A lower pressure within the cavity will reduce deformation of the diaphragm component and cause the piston to move rearwardly into an "open" position under influence of spring 136A as seen in FIGS. 12B and 24B. The spherical nose 126A disengages from its seat 148A in the "open" rod position, allowing air flow into and through the valve. In the open valve position, air is admitted into the bore 62A from the inlet channel 152 and directed out of the outlet port passageways 154A, 155 to the bi-directional block 40A. The bi-directional block 40A, as explained below, directionally routes the air from the control regulator along one of two parallel air flow paths to the air pumping tube 30 mounted within tire 12. Rotation of the tire 12 over a ground surface pressurizes the air within the tube 30 and outlets the pressurized air back through the bi-directional block and into the tire cavity. The air pressure within the tire cavity 28 is thereby brought back up to rated or recommended air pressure level.

FIGS. 12B and 24B show an outward deformation of diaphragm 132A placing the control regulator piston in the open, unseated condition. Air from the filter layer 69 is admitted past the unseated spherical nose 126A of piston 124A for exit out the outlet passageways 154A, 155 to the bi-directional block 40A. The actuator guide 138A centers the piston 124A during reciprocal axial movement of the piston between open and closed positions within the bore 62A. It will be appreciated that the air tube 30, under control from the control regulator valve assembly 68A, only receives air to compress when air is allowed to flow to the bi-directional block 40A. When air flow is blocked by the valve assembly 68A, air flow to the bi-directional block 40A and to pumping tube 30 terminates. By limiting the pumping operation of the air tube 30 to only those times when the tire pressure is low, cyclical failure of the component parts of the air maintenance system due to fatigue is avoided. When air pressure within the tire cavity is low, air flow to the pumping tube 30 is initiated, allowing the bi-directional block 40A to deliver air to and receive pressurized air from the pumping air tube 30.

For example, the control regulator of FIGS. 9A, 10A, 11A, 12A, 24A may be set at a pressure of 100 psi by appropriate adjustment of the compression force of spring 136A, with initial tire cavity pressure of 90 psi. The lower than desired tire cavity pressure will be communicated to the outward side of diaphragm 140A through the passageway from cavity 144A. The compression set of spring 136A will enable to spring to uncoil, forcing the piston axially to the rear, opening the valve as seen in FIGS. 12B and 24B. Air flow through the valve and through the passageways 154A, 155 is directed to the bi-direction block and from the block to the air pumping tube 30. The tube 30 pumps the air to a pressure greater than 90 psi and directs the pressurized air back to and through the block 40A into the tire cavity. When the tire cavity achieves a desired pressure of 100 psi., the diaphragm 140A is pressured back into its condition of FIGS. 12A and 24A, forcing the piston 124A forward into the seated, "closed" position. Further air flow through the control regulator to the bi-directional block 40A is thereby blocked until required by tire cavity low pressure.

Figure 13A:
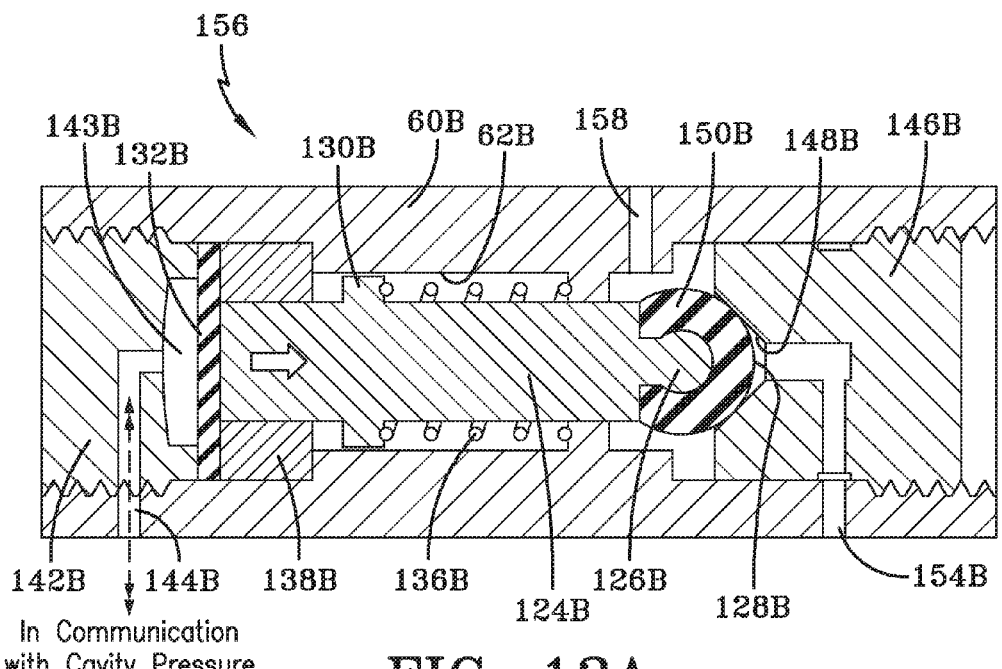
FIG. 13A is a section view of an alternative second cold set inflation control regulator embodiment with the tire cavity pressure above the set pressure, not allowing air to pass.
Figure 13B:
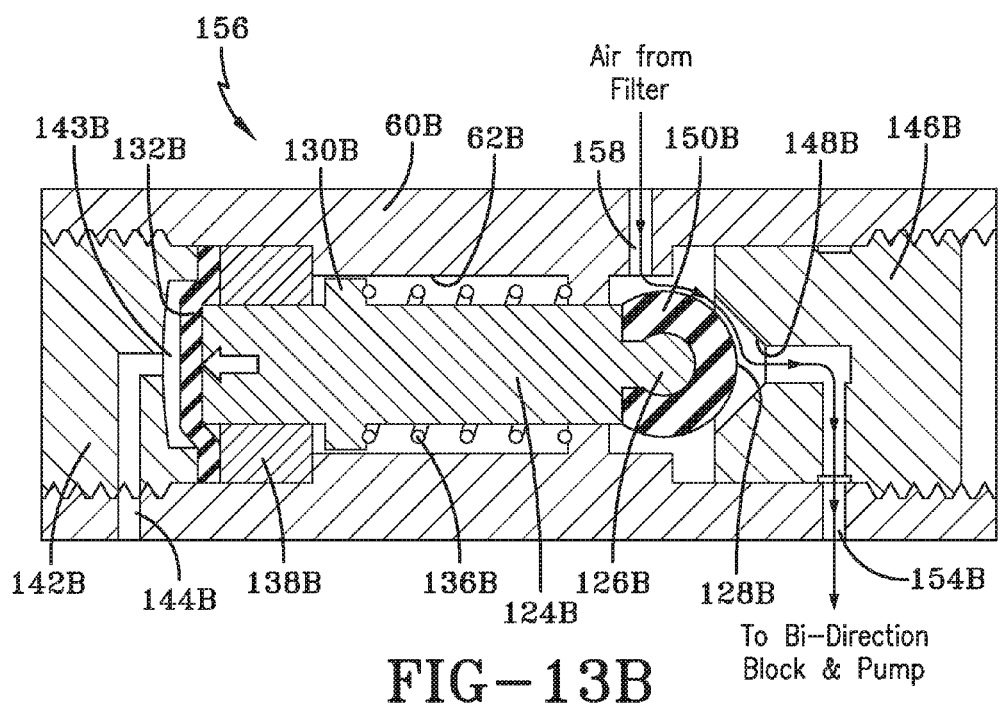
FIG. 13B is a section view of the second cold set inflation control regulator embodiment with the tire cavity pressure below the set pressure, allowing air to pass.

FIGS. 13A and 13B show an alternatively configured control regulator valve 156 in the closed and open positions, respectively. The inlet 158 through the valve is placed through the regulator body 60B rather than the set pressure adjustable screw 146B. A filter element such as 69 (not shown) may be incorporated into the inlet passageway if desired. Operationally, the second embodiment of the valve functions as described above for the first embodiment. A lower than desired air pressure in the tire cavity causes the piston 124B to axially move to the rear, unseating the rod forward end 126B and allowing air to flow into the valve body through inlet 158 as seen in FIG. 13B. Air flow to the bi-directional block and the air pump is enabled until a desired tire cavity air pressure is achieved. Upon reaching the preset tire cavity pressure, the piston 124B moves forward and into the closed position shown in FIG. 13A. It is to be understood that the regulator valve 156 shown in FIGS. 13A and 13B is similar in structure to the regulator valve 68A shown in FIGS. 12A and 12B. As a result, the component numbers are similar, with the letter "B" following the numbers in FIGS. 13A and 13B, while the letter "A" follows the numbers in FIGS. 12A and 12B.

Figure 14A:
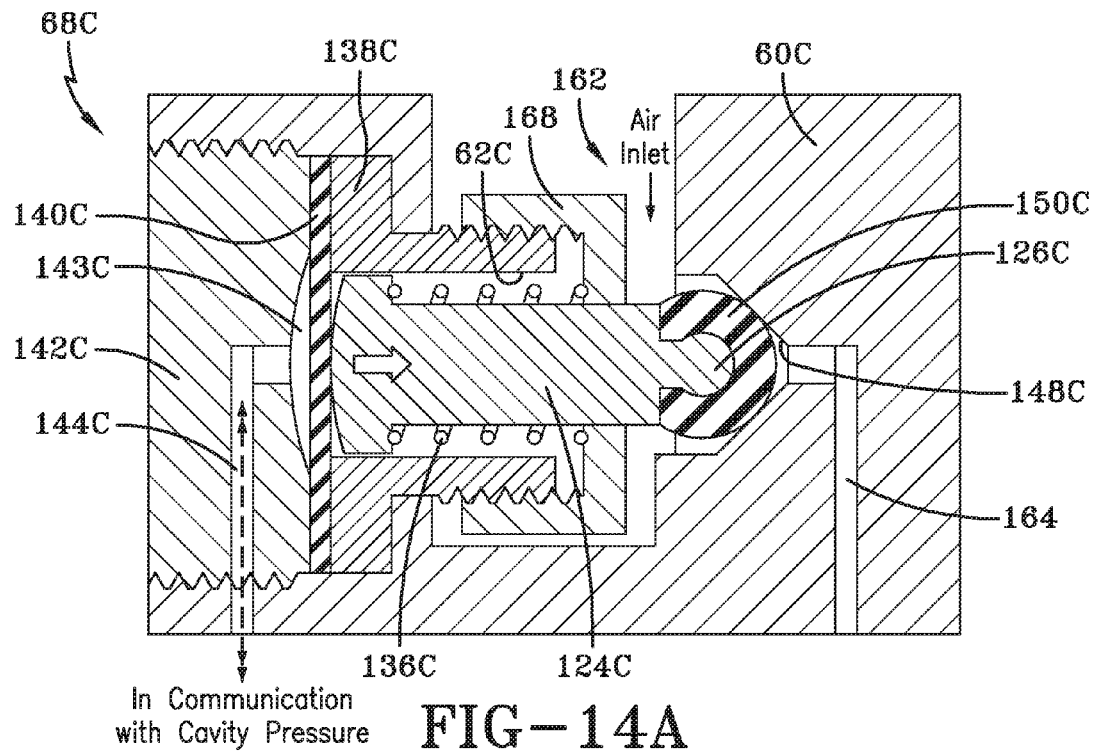
FIG. 14A is a section view of a third cold set inflation control regulator embodiment with the tire cavity pressure above the set pressure, not allowing air to pass.
Figure 14B:
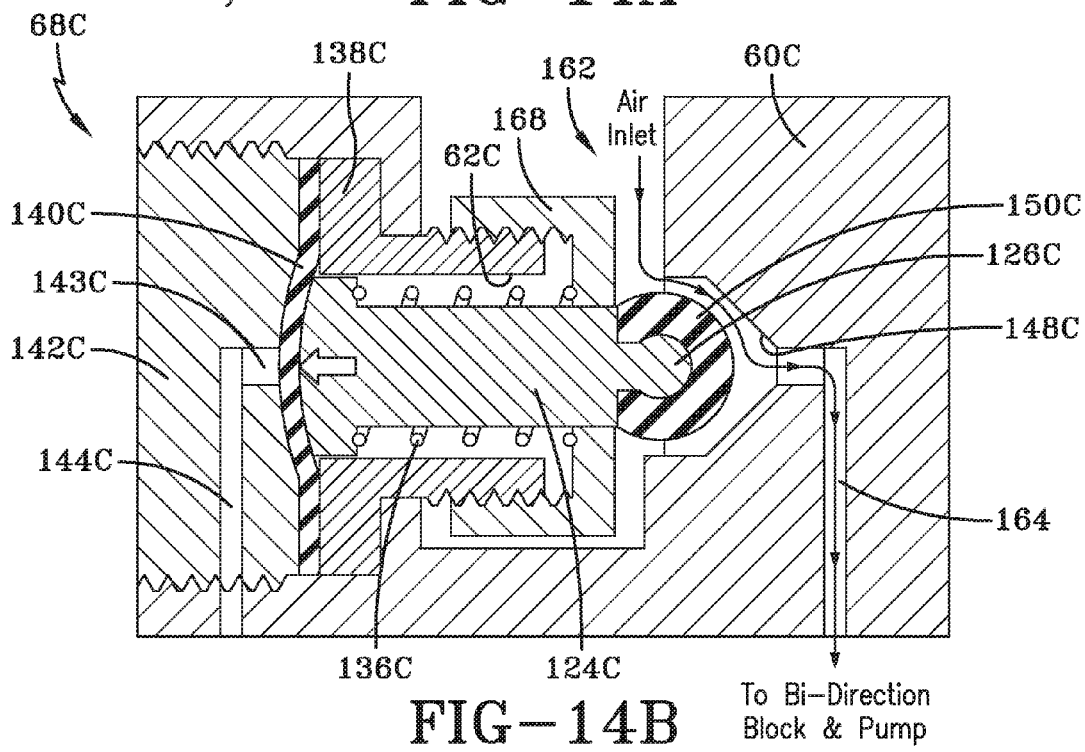
FIG. 14B is a section view of the third cold set inflation control regulator embodiment with the tire cavity pressure below the set pressure, allowing air to pass.

FIGS. 14A and 14B show a third alternative control regulator valve 68C in the closed position (FIG. 14A) and the open position (FIG. 14B). A filter element such as 69 (not shown) may be incorporated into the inlet passageway if desired. In the embodiment shown, the housing 60C is configured to have an inlet opening 162 to admit air from the filter 69 into the housing. The diaphragm seal or centering guide 138C is adapted having a threaded post to which a set pressure adjustment collar 168 attaches. Rotation of the collar 168 adjusts the compression of the spring 136C which, as described previously, creates a threshold pressure that opens and closes the valve. The seat 166 for the piston 124C is formed by the regulator housing 60C. With the valve in the closed position of FIG. 14A, the seated piston 124C prevents air from flowing from the filter 69 into the regulator housing. The diaphragm 140C, pushed by tire cavity pressure, maintains the piston 124C in the closed, seated position. When air pressure falls below desired level in the tire, as seen in FIG. 14B, the valve opens. Piston 124C, under spring bias, moves axially out of the seat 166 allowing air to enter the housing through channel 162. Air is passed through the regulator housing as shown and exits at passageway 164 to the bi-directional block for distribution to the air pumping tube 30. It is to be understood that the regulator valve 68C shown in FIGS. 14A and 14B is similar in structure to the regulator valve 68A shown in FIGS. 12A and 12B and to the regulator valve 156 shown in FIGS. 13A and 13B. As a result, the component numbers are similar, with the letter "C" following the numbers in FIGS. 14A and 14B while the letter "A" follows the numbers in FIGS. 12A and 12B, and the letter "B" follows the numbers in FIGS. 13A and 13B.

Figure 15:
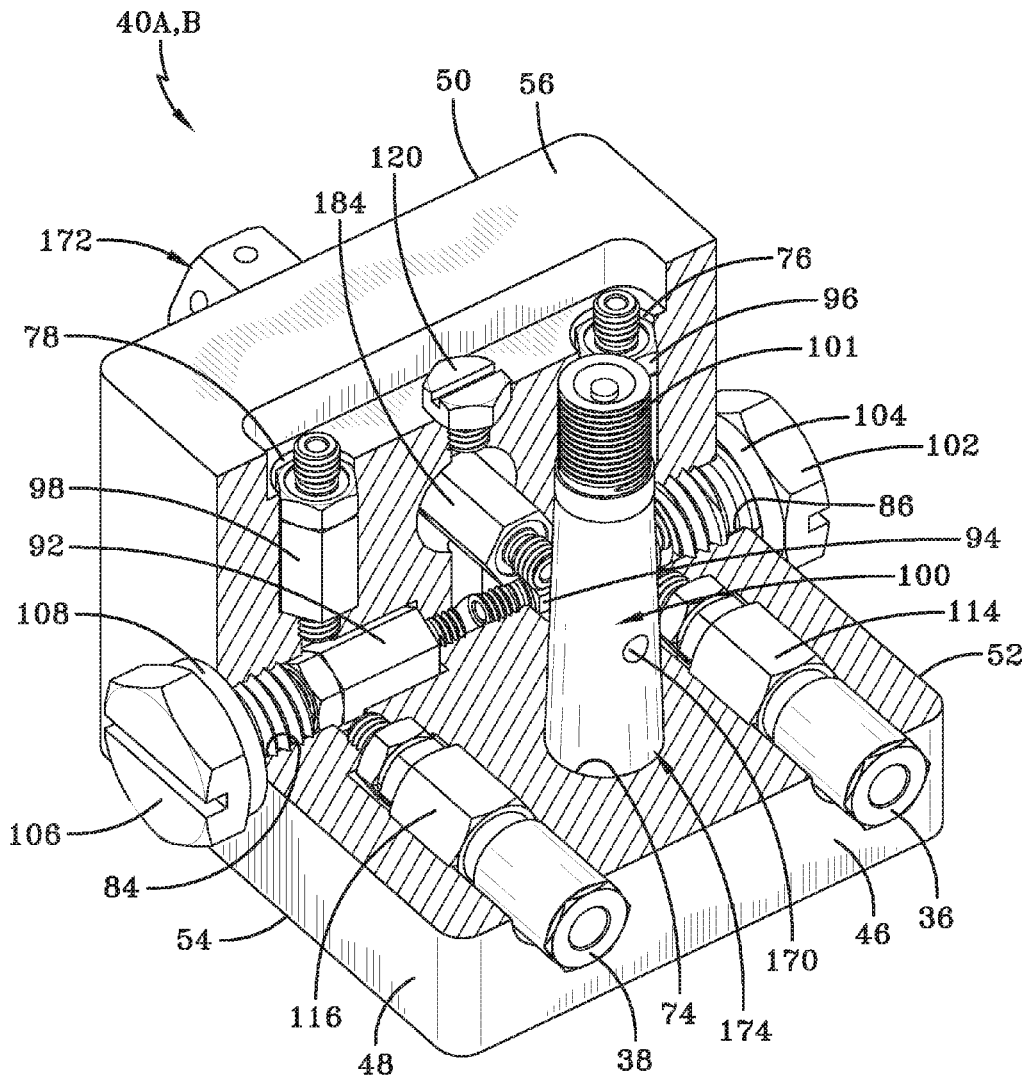
FIG. 15 is a partially sectioned perspective view of the bi-directional block.
Figure 16:
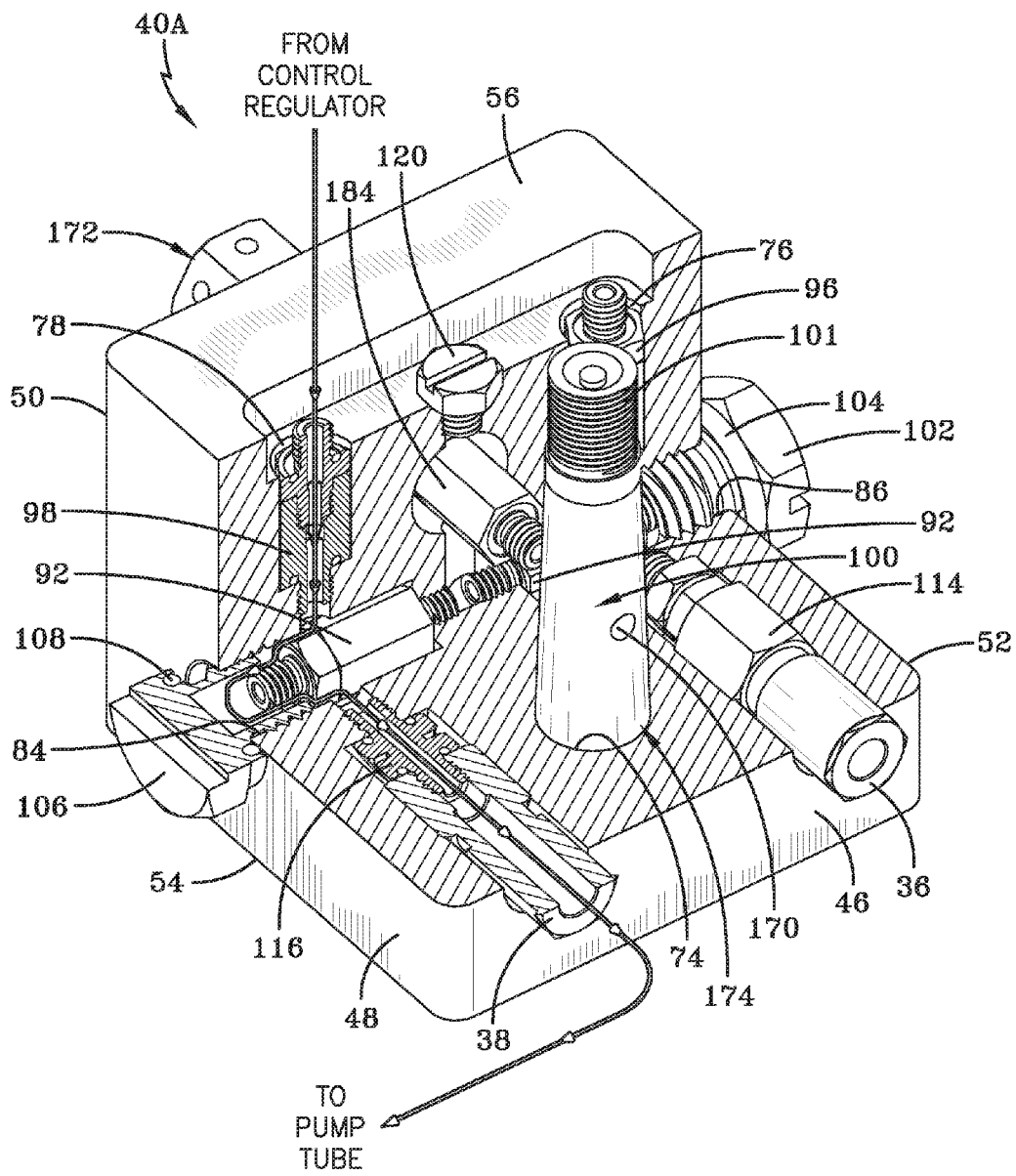
FIG. 16 is a partially sectioned perspective view of the bi-directional block (first flow direction) showing the air coming from the control regulator through a duck valve assembly, around a duck valve assembly, through a fitting assembly and out to the pump tube.
Figure 19:
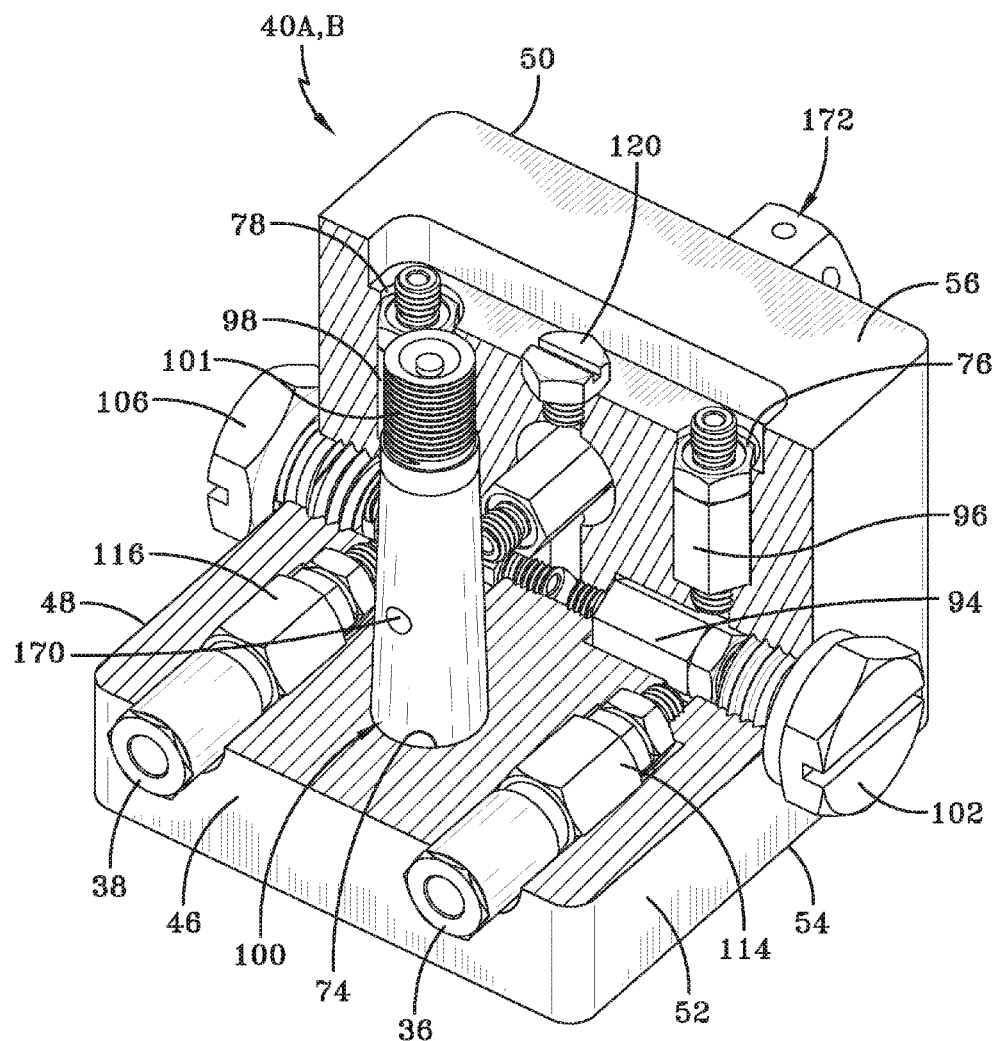
FIG. 19 is a partially sectioned perspective view of the bi-directional block.

Referring to FIGS. 15, 16 and 19, the internal configuration of the bi-directional block 40A, B is shown in broken perspective. FIG. 15 is a partially sectioned perspective view of the basic bi-directional block internal configuration. FIG. 16 is a partially sectioned perspective view of the bi-directional block (in a first flow direction) showing the air coming from the control regulator of FIG. 9A described above. As shown in FIG. 15 and described above, the inlet/outlet conduits 36, 38 represent parallel pathways for air to flow to and from the air pumping tube 30. The conduits 36, 38 have connectors 114, 116 that connect into the block 40A, B and communicate air to and from the air tube 30 (not shown). Check valves 92, 94, 96, 98 mount into sockets within the block 40A, B and create an air flow scheme designed to bi-directionally direct air to and from the air tube. Check valves 98 and 92 are mounted at right angles to each other and at right angles with the connector 116. Valves 98, 92, and connector 116 form part of what is herein referred to as a "first" block air pathway. Valves 96, 94, and connector 114 are likewise mounted at right angles and form part of what is herein referred to as a "second" block air pathway. The first and second block air pathways are located at opposite sides of the block 40A B. Check valves 96, 98 connect externally from the block 40A, B to the outlet air pathways 154A, 155 of the control valve regulator 68A (not shown).

The valve stem 100 inserts into throughbore 74 from the underside of the block 40A, B with the screw threaded end 101 of the valve stem 100 protruding from the throughbore 74 at a top side of the block 40A, B. The valve stem 100 includes an air inlet passageway 170 extending transversely through the valve stem in airflow communication with an internal valve stem chamber 174 (reference FIG. 22A). A pressure relief valve 172 mounts into the block and operationally acts to vent pressurized air from the block 40A, B when the tire cavity is at full air pressure.

FIG. 16 shows the air flowing through the block 40A, B from the regulator in the first air flow direction. Air enters the block 40A, B from the control regulator through the check valve 98 and is directed through an internal axial chamber 176 within the plug 106, bypassing the check valve 92. From the plug chamber 176, air flows through the connector fitting 116 and into conduit 38 to the pump tube 30. The air upon entering the pump tube is compressed as the tire rolls along a ground surface.

The air from the control regulator is routed through the valve 98, around the check valve 92, through the air cavity 176 within hollow screw 106, into the axial passageway of connector 116, and finally into the outlet conduit 38. The air exits through the outlet conduit 38 to the air tube 30 (not shown), mounted within the tire sidewall. As explained previously, air from the control regulator will only be inputted into the check valve 98 of distribution block 40A, B from the control regulator when the air pressure within the tire cavity is below a preferred level. Cavity pressure at or above rated level will cause the regulator to block air flow to the block 40A, B.

Figure 17:
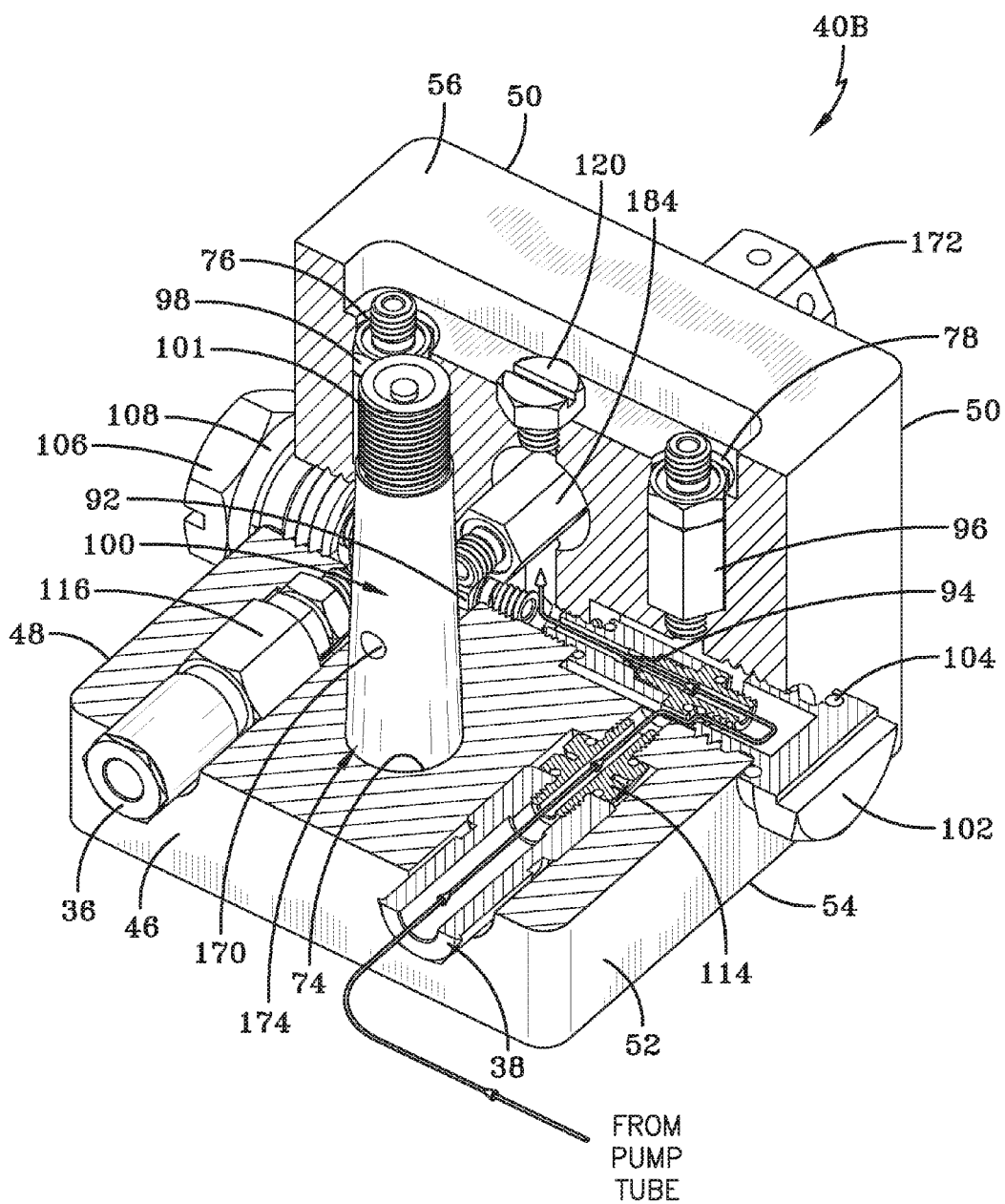
FIG. 17 is a partially sectioned perspective view of the bi-directional block (first flow direction) showing the air coming from the pump tube into a fitting assembly, through a duck valve assembly and up into a groove.
Figure 18A:
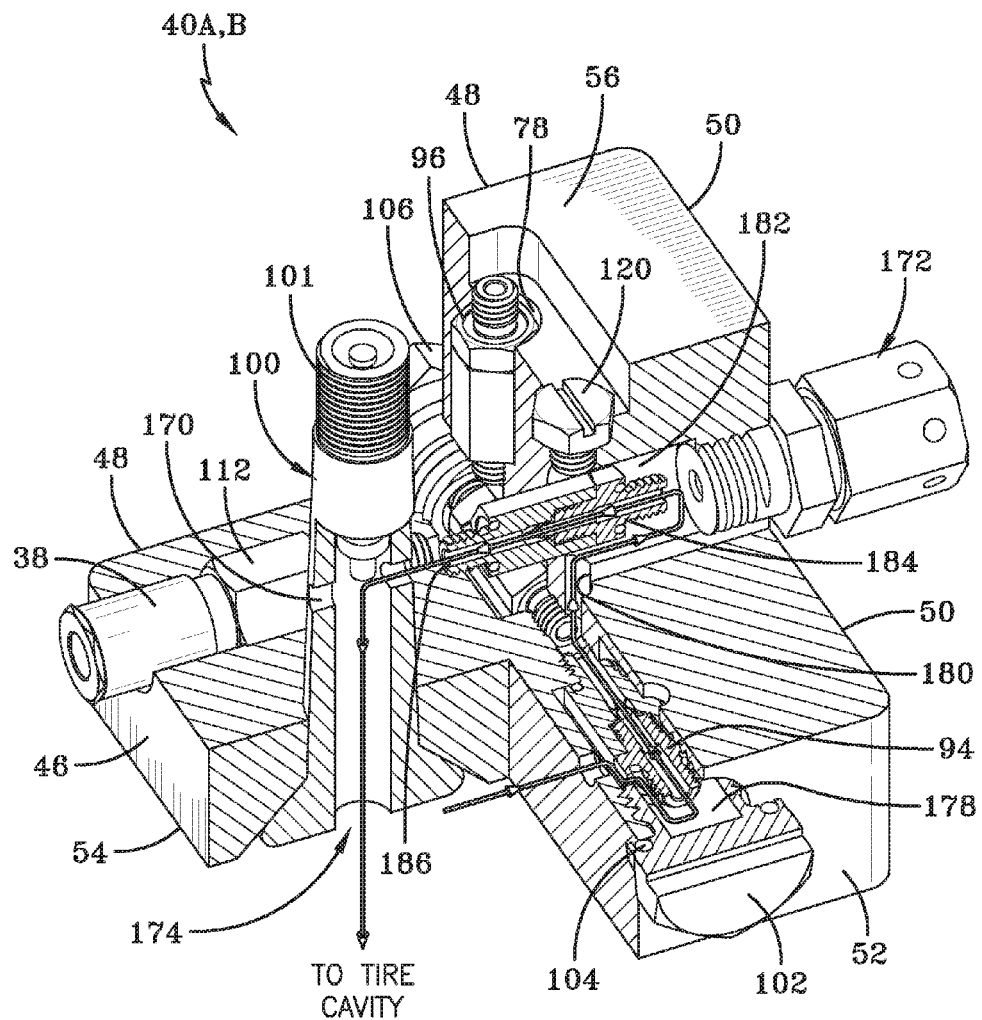
FIG. 18A is a partially sectioned perspective view of the bi-directional block (first flow direction) showing the air continuing from the groove through a duck valve assembly, into the valve stem and into the tire cavity in the condition that the tire cavity is at low pressure.
Figure 22A:
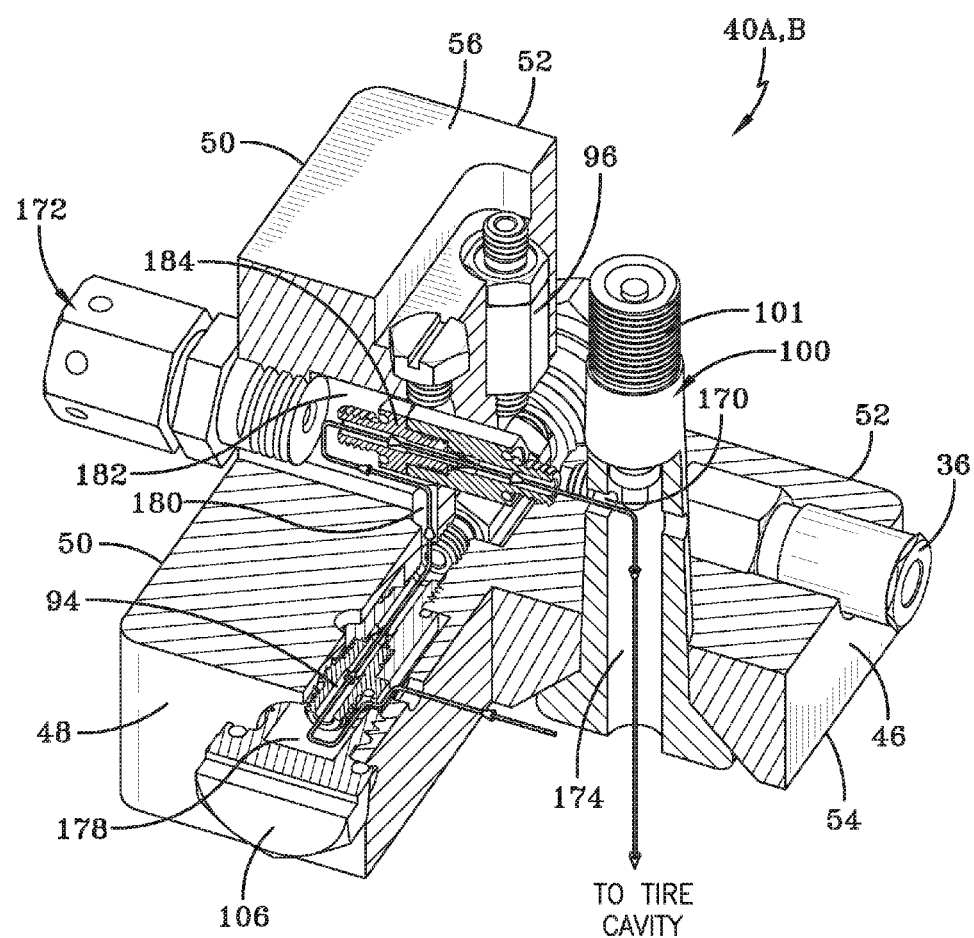
FIG. 22A is a partially sectioned perspective view of the bi-directional block (second flow direction) showing the air continuing from the groove through a duck valve assembly, into the valve stem and into the tire cavity in the condition that the tire cavity is at low pressure.

FIGS. 17, 18A, and 22A show the return of pressurized air from the pumping tube 30 into the block 40A, B. Pressurized air from the pumping tube follows a similar curvilinear path through the block 40A, B to finally enter the valve stem 100 and from the valve stem the tire cavity. FIG. 17 is a partial perspective view of the internal block from an opposite side to FIG. 16. As shown in FIGS. 17, 18A and 22A, pressurized air from the pump tube 30 enters from conduit 36 into the block 40A, B and flows through connector fitting 114, through shank-located air chamber 178 of the assembly screw 102. The pressurized air opens and continues through check valve 94 along a formed enclosed block channel 180 into an air chamber 182 forwardly disposed from the relief valve 172. A fifth check valve 184 is positioned within the block 40A, B between the air chamber 182 and location of the valve stem 100. A formed air passageway 186 within the block 40A, B connects air flow from the check valve 184 to the transverse air passageway 170 extending through the valve stem 100. Thus, pressurized air opens and is routed through the check valve 184, follows the air passageway 186, and enters the valve stem air collection chamber 174 by way of passageway 170. From the air collection chamber 174, the pressurized air is directed to the tire cavity to raise air pressure within the cavity to the desired level.

FIG. 18A is a partially sectioned perspective view of the bi-directional block 40A, B (first flow direction) showing the return of pressurized air from the air pumping tube 30 (not shown) through the block 40A, B and into the valve stem 100. FIG. 22A is a similar sectioned perspective view from a reverse angle showing pressurized air flow through the block 40A, B to the tire cavity. It will be appreciated that the air flow paths described herein are directed through internal channels formed within and by the distribution block 40A, B. Removal of sections of block 40A, B, including portions forming the internal channels, are depicted for the purpose of illustration. The pressurized air exits check valve 184 into passageway 186 and is directed thereby through the portal 170 of the valve stem 100 into the internal air collection chamber 174 within a base end of the valve stem. From the collection chamber 174, the pressurized air is directed to the tire cavity to restore cavity pressure to its preferred level.

Figure 18B:
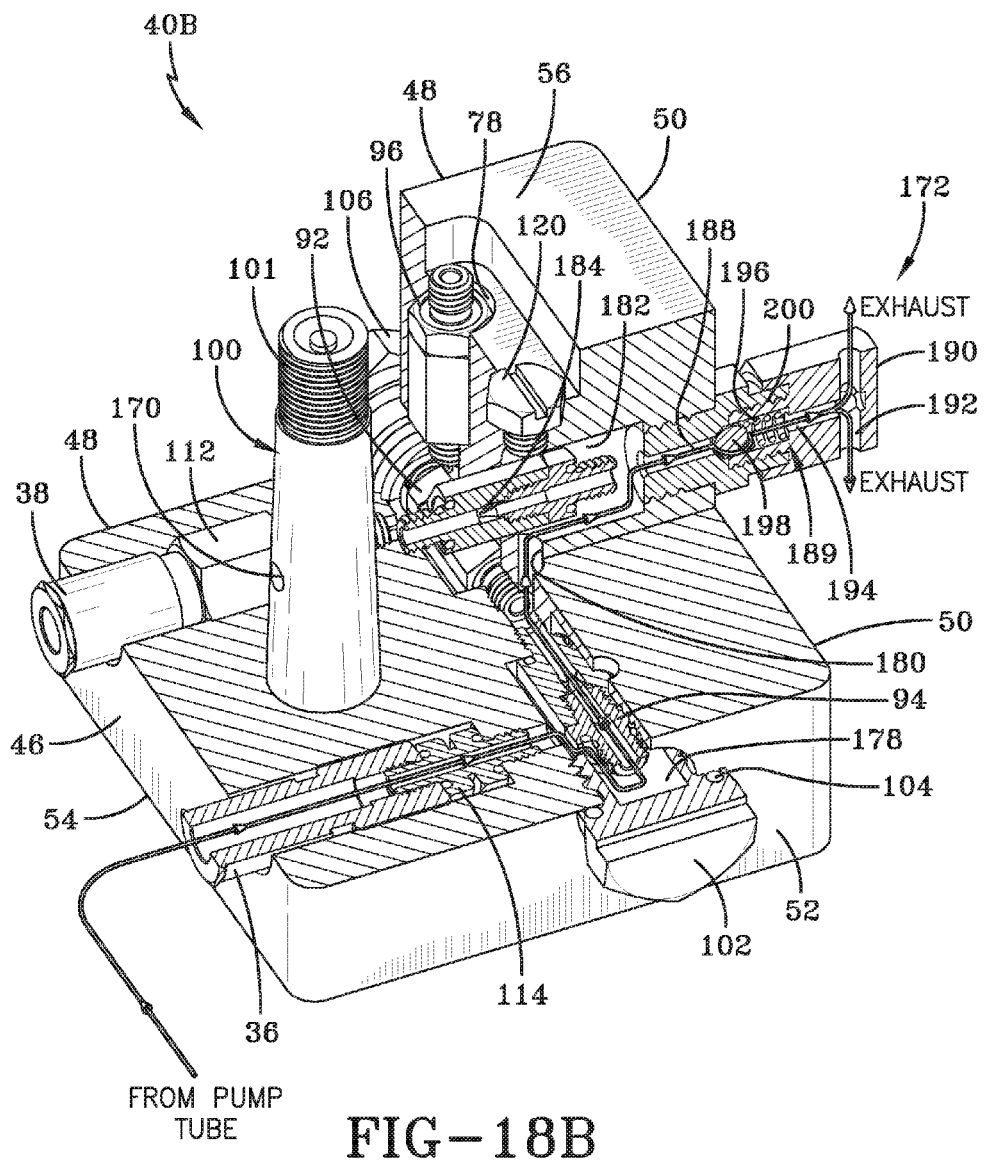
FIG. 18B is a partially sectioned perspective view of the bi-directional block (first flow direction) showing the air continuing from the groove through an exhaust valve in the condition that the tire cavity is at or above the desired pressure.

FIG. 18B is a partially sectioned perspective view of the bi-directional block 40B (first flow direction) showing in greater detail the internal configuration of relief valve 172. If the tire cavity is at or above the desired pressure, pressurized air from the air pumping tube 30 cannot reach the tire cavity but is instead exhausted to atmosphere through the relief valve 172. The relief valve is configured as an adjustable check valve as shown but other relief valve configurations may be employed if desired. As shown in FIG. 18B, pressurized air enters inlet 188 of the relief valve 172. An internal check valve 189 is positioned within an axial air chamber 192. A coil spring 196 is captured within the chamber 192 and exerts a spring force on ball 198. The ball 198 seats in a closed position to block air flow. When air pressure at the forward end of the check valve exceeds the preset compression force of the spring 196, the ball 198 unseats and air flow is enabled through an outlet passage 194 from the valve and into a threaded spring compression-adjustment cap 190. The cap 190 has an exhaust outlet 192 extending therethrough. The cap has screw threads 200 to adjust the compression force on the spring 196. It will be appreciated that pressurized air flow through the block 40B is directed to the forward end of the relief valve by the groove 180. If the air pressure within the tire cavity is higher than the pressure of the air flow through groove 180, the air will not be admitted through the check valve 184. The air flow pressure will open the relief valve and be allowed to vent through the valve.

FIGS. 17 and 18B show the block 40B receiving pressurized air pumped from the air tube 30 (not shown) mounted to the tire 12. Pressurized air from the pumping tube is routed through the inlet/outlet conduit 36 to the block 40B, entering through coupling connector 114 and following a serpentine path through the hollow axial center chamber 178 of the screw 102. Duck valve 94, seated within the screw 102, opens and conducts the air flow into the relief valve 172 if the tire cavity pressure is at or greater than specified level. Relief valve 172 operates to vent the pressurized air in the event that the cavity pressure is at or above desired set pressure. If the cavity pressure is lower than set pressure, the pressurized air from the pumping tube is directed through check valve 184 into the channel 170 of the valve stem 100 and into the center air collection chamber 174 of the valve stem. From there, the pressurized air is sent to the tire cavity, bringing cavity air pressure up to desired level. As explained previously, air to the block 40B only occurs when the control regulator opens. Pressurized through the block 40B to the valve stem 100 and therefrom to the tire cavity only occurs if the relief valve 172 remains closed. Should air pressure within the tire cavity be sufficiently high, the relief valve 172 will open and vent the pressurized air passing through block 40B.

Figure 20:
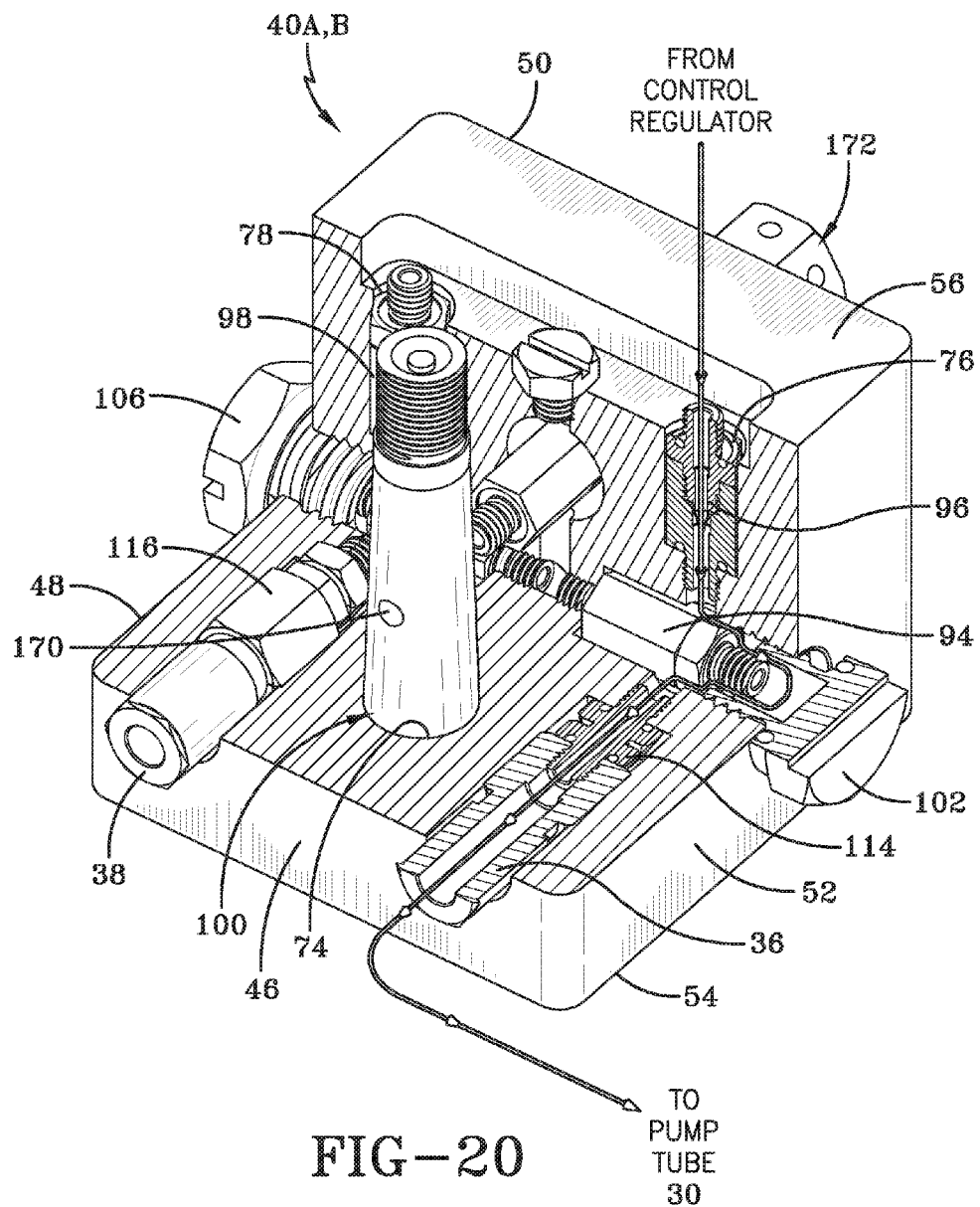
FIG. 20 is a partially sectioned perspective view of the bi-directional block (second flow direction) showing the air coming from the control regulator through a duck valve assembly, around a duck valve assembly, through a fitting assembly and out to the pump tube.

FIG. 20 is a partially sectioned perspective view of the bi-directional block (second flow direction) showing the air coming from the control regulator through the duck valve assembly 96, around the duck valve assembly 94, through the fitting assembly 114 and out to the pump tube 30 by way of conduit 36. The block 40A, B is constructed such that the first and second air pathways are formed by symmetric mirror image arrangement of the check or duck valves. The above description of the conduction of air through the block along the first pathways will thus be understood to apply equally to the operation during conduction of air through the block 40A, B along the second air pathway.

Figure 21:
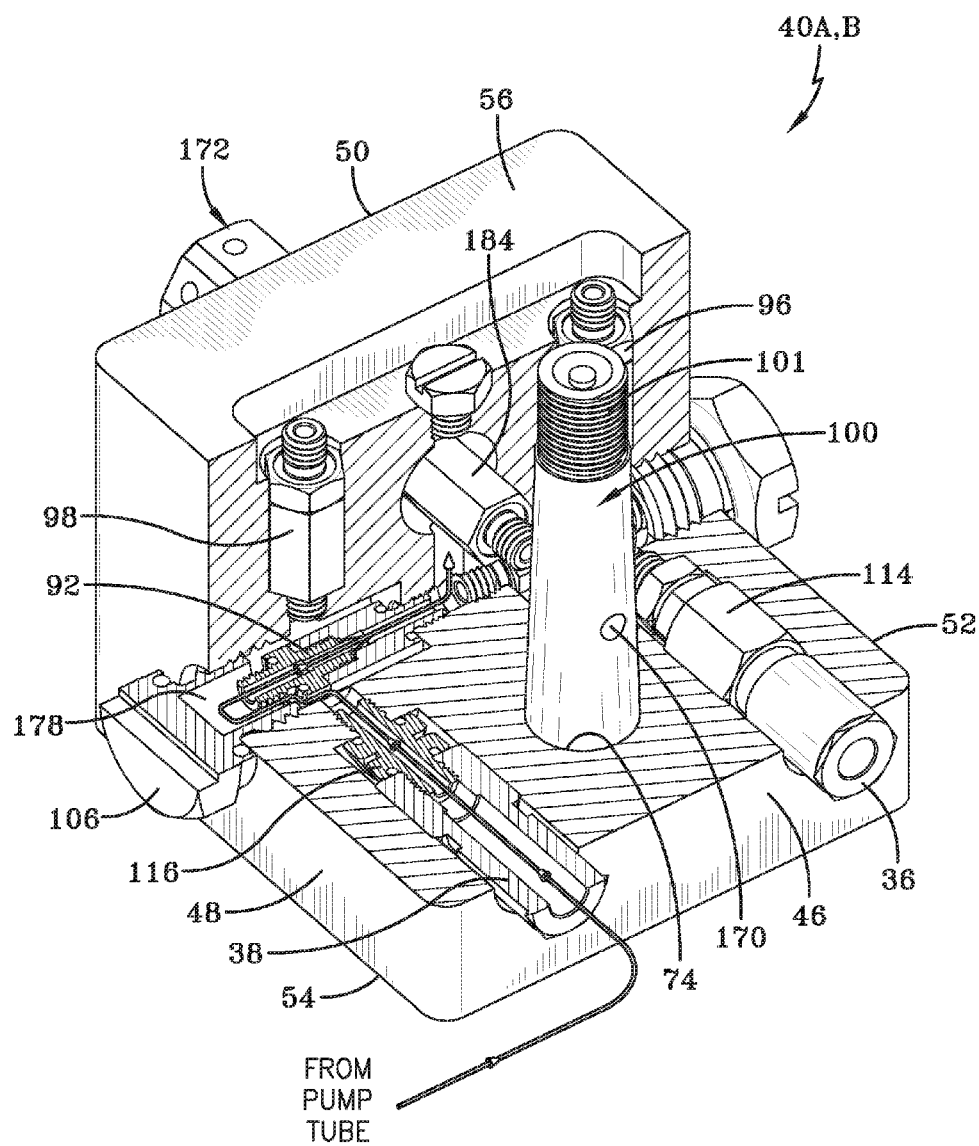
FIG. 21 is a partially sectioned perspective view of the bi-directional block (second flow direction) showing the air coming from the pump tube into a fitting assembly, through a duck valve assembly and up into a groove.

FIG. 21 is a partially sectioned perspective views of the bi-directional block (second flow direction) showing the air coming from the pump tube into a fitting assembly, through the duck valve assembly 92 and through an internal block air channel to check valve 184. Pressurized air is thereby conducted into the valve stem via the second air flow path.

Figure 22B:
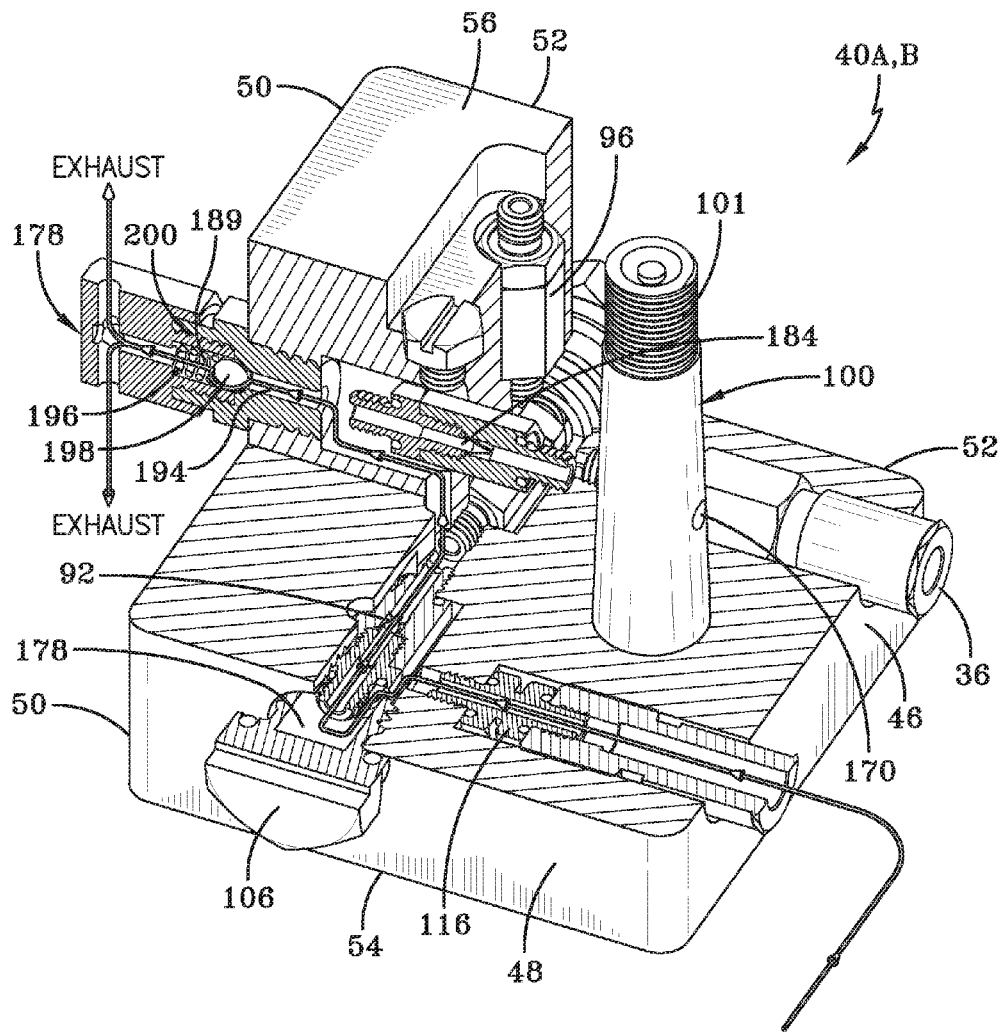
FIG. 22B is a partially sectioned perspective view of the bi-directional block (second flow direction) showing the air continuing from the groove through an exhaust valve in the condition that the tire cavity is at or above the desired pressure.

FIG. 22B is a partially sectioned perspective view of the bi-directional block (second flow direction) showing the air continuing from the groove through an exhaust valve in the condition that the tire cavity is at or above the desired pressure.

With reference to FIG. 23, the assembled regulator plate 58A and bi-directional distribution block 40A is shown. The regulator cover plate 58A assembles over the block 40A, completing the formation of outlet air passageways 154A, 155 into the block 40A. The passageway 144A of the regulator control assembly 68A establishes air flow communication with passageway 145 through the block. Passageway 145 intersects the passageway 186 which communicates with the internal chamber 174 of the valve stem through transverse opening 174. The chamber 174 is connected to the tire cavity so that air pressure of the cavity is communicated through the block passageway 145 and the regulator passageway 144A to the outward side of diaphragm component. The regulator is thus capable of responding to change in cavity air pressure by opening and closing. The regulator 68A opens to direct air through the block 40A to the pumping tube 30 (not shown) whenever cavity air pressure is low and closes to preclude transmission of air to the tube 30 whenever cavity air pressure is at or above desired level. Should cavity air pressure exceed an upper threshold, pressurized air may be vented through relief valve to atmosphere.

From FIG. 23, it will further be appreciated that the conventional primary input valve housed within the end 101 of the valve stem 100 may be activated and operated in conventional manner to admit air into the valve stem air chamber 174 from an external primary pressurized air source (not shown). The primary external air source thus shares the air chamber 174 within the valve stem 100 with the pumping tube pressurized air source. Such system redundancy affords greater reliability in effecting and maintaining desired tire inflation pressure.

Figure 9B:
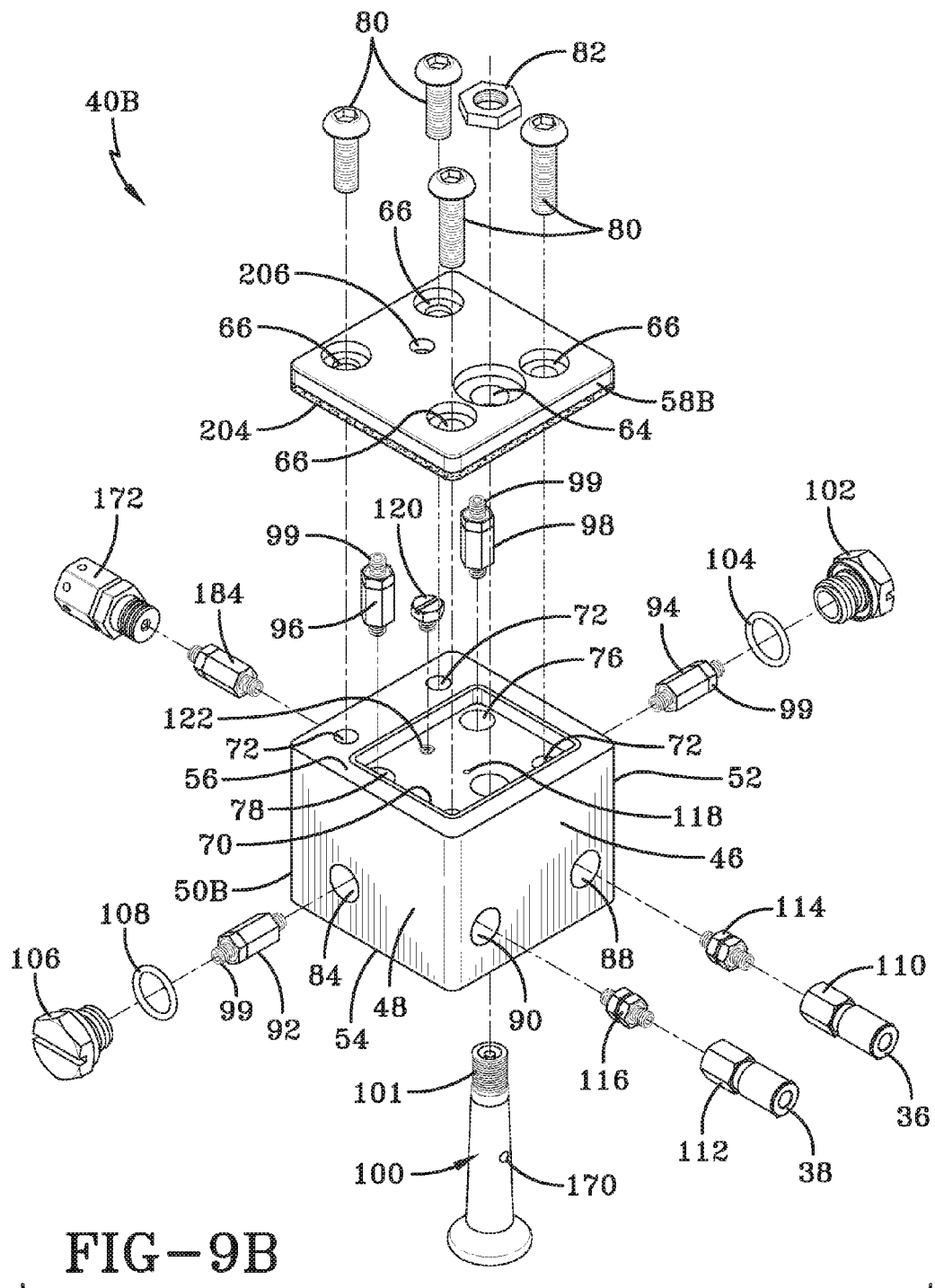
FIG. 9B is an exploded perspective view of an alternative second embodiment of the pressure control system.
Figure 10A:
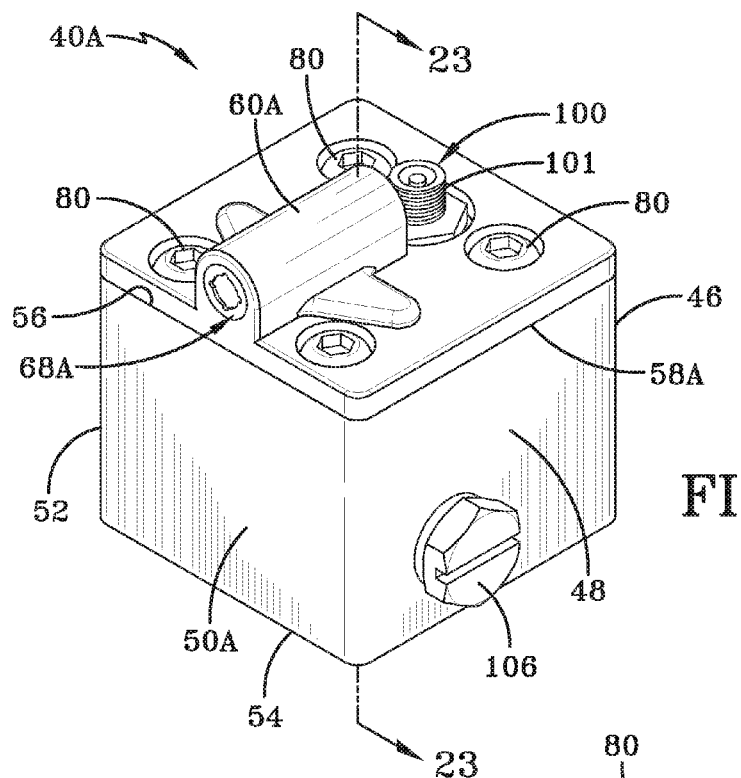
FIG. 10A is an angle perspective view of the first embodiment of the stem mounted bi-directional AMT pressure control system.
Figure 10B:
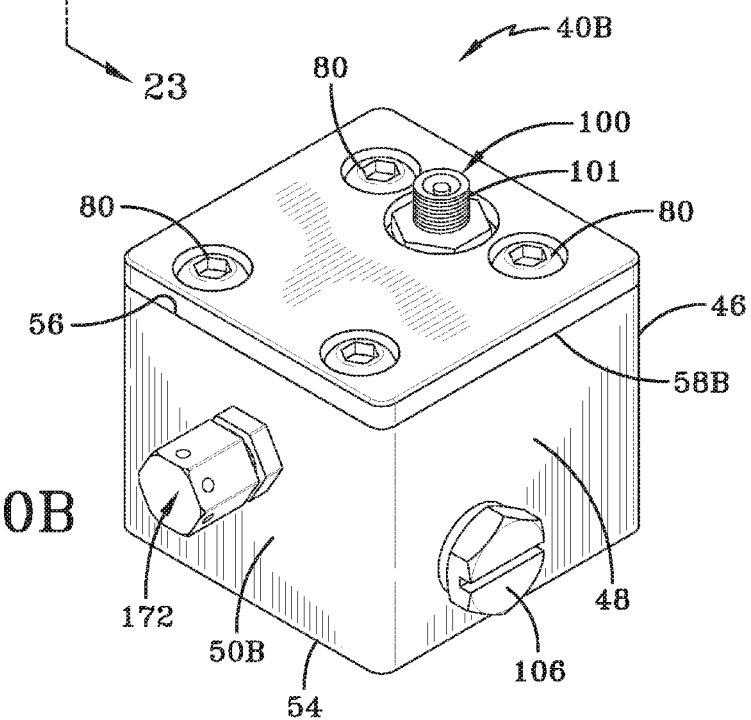
FIG. 10B is an angle perspective view of the second embodiment of the AMT pressure control system.
Figure 11B:
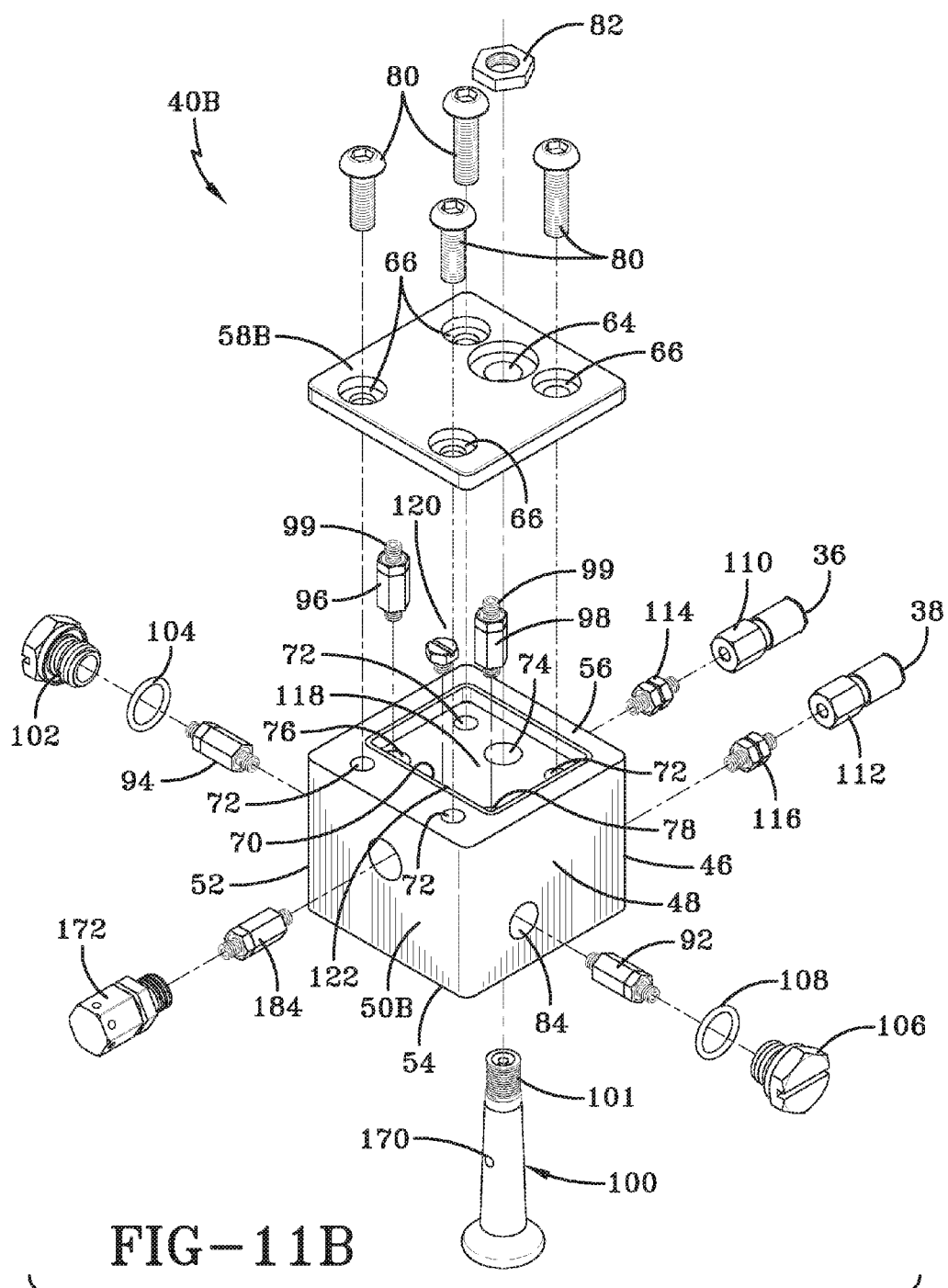
FIG. 11B is an opposite angle to FIG. 9B exploded perspective view of the second embodiment of the pressure control system.

The subject control valve assembly 58A may be omitted if desired in a simplistic alternative embodiment of the subject invention as seen in FIGS. 9B, 11B. As discussed above, the regulator 58A limits operation of the pumping tube by blocking the delivery of ambient, non-pressurized air to the pumping tube whenever cavity air pressure is at or above rated pressure. This feature saves the pumping tube from being in a constant active or operational mode pressurizing air and reduces fatigue within the system. Whenever ambient air to the pumping tube is not being delivered, the pumping tube enters a passive non-pumping stat. However, if desired, the delivery of air to the pumping tube may be constant by reconfiguring the system to eliminate the control valve regulator 68A, C. As shown, the bi-directional block 40B remains the same in routing air within parallel air paths through the block to and from the pumping tube. The cover plate 58B is modified by the elimination of the regulator 68A, C. An air inlet opening 206 extends through the cover plate 58B to admit constant air flow into the distribution block recess 70. A filter pad or layer 204 may be affixed to an underside of the cover plate 58B to purify air admitted into the block. Input air is collected within the top recess 70 of the block. Depending on the tire rotational direction, the collected input air is drawn by the pumping tube 30 along one or the other air flow paths through the block 40B and into the pumping tube for pressurization. This simplified configuration thus keeps the pumping tube 30 in a constant pressurization mode of operation.

From the foregoing, it will be appreciated that the subject invention provides a conventional valve assembly mounted within a tire valve stem 100 for operably controlling a flow of pressurized air from a conventional external pressurized air source, such as a service station pump, into the tire cavity. Air pressure within the tire cavity may thus be restored manually in a conventional manner. In addition and ancillary to the manual restoration of tire air pressure, the tire-mounted air pumping tube 30 is mounted within a tire sidewall to provide an ancillary pressurized maintenance air supply into the tire cavity 28 to maintain air pressure. The duality of pressurized air sources into the tire cavity affords a redundant means by which the tire can retain proper inflation. The control assembly 14, combining the control regulator 68A and the bi-directional air distribution block 40A, is positioned at a control location in proximal relationship to the valve stem 100 operative to control the flow of tire-generated pressurized air from the tire-mounted air pumping tube 30 responsive to a detected air pressure level within the tire cavity 28.

The pressure control regulator 68A, C operably controls pressurized air flow from the pumping tube by controlling the flow of ambient non-pressurized air to the tire-mounted tube. Ambient air flow is blocked by the regulator 68A, C whenever tire air pressure does not require an increase.

It will further be noted that the valve stem 100 is sized and configured to extend through a rim body 16 and through the control system 14. The integral receipt of the valve stem 100 through the block 40A and the regulator 68A forming the control assembly mechanically integrates the system with the valve stem and tire-based pumping systems to share the internal passageway and air collection chamber 174 of the valve stem 100. The pressure control assembly (regulator 68A and block 40A) mounts to a surface of the rim body at the control location in proximal relationship with the valve stem 100 and receives the valve stem therethrough. The bulk and geometric size of the regulator 68A and block 40A is accordingly not carried by the tire at the inlet and outlet ports to the pumping tube 30. The problem of mounting and maintaining a regulator and distribution block to the tire throughout tire use is thereby avoided. The mounting location of regulator 68A and block 40A in a proximal relationship with the valve stem 100 and directly to the rim 14 promotes structural integrity and minimizes inadvertent separation of such components through tire use. In addition, the components 68A, 40A, and the filter element 69 may be accessed, repaired and/or replaced if that becomes necessary during the course of tire operation.

The air pumping tube 30 mounts as described within a flexing region of a tire sidewall. So located, the tube 30 closes and opens segment by segment in reaction to induced forces from the tire flexing region as the flexing region of the tire wall rotates opposite a rolling tire footprint. The circular configuration of the air pumping tube and the operation of the bi-directional air distribution block 40A, B provides for air pumping to the tire cavity in both forward and reversed direction of tire rotation against a ground surface. Air pressure maintenance is accordingly continuous irrespective of tire rotational direction.

The advantages of the subject invention is that the rim valve stem 100 functions as designed to fill air into the tire with the use of a standard external device. The air passageway 174 at the bottom of the valve stem allows the pumped air into the valve stem air passageway and then the tire cavity and also provides a portal air pressure sensing by the regulator 68A, C. The set pressure is easily adjusted by screw adjustment to the control regulator 68A, C without dismounting the tire. The filter 69 and the regulator 68A, C in its entirety may be easily replaced if needed. Moreover, no passageway holes on the tire sidewall is needed to interconnect the pumping tube 30 to the pressure regulator assembly 14.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire assembly comprising:
  a tire having a tire cavity bounded by first and second sidewalls extending to a tire tread region;
  a tire-mounted air pumping means for pumping pressurized air into the tire cavity to maintain air pressure within the tire cavity at a preferred pressure level;
  a tire having an elongate valve stem projecting outward from the tire cavity, the valve stem having an internal valve stem air passageway in communication with the tire cavity operative to direct pressurized air from the valve stem air passageway into the cavity;
  a pressure control assembly positioned at a control location proximate the valve stem and operative to selectively control a flow of pressurized air from the tire-mounted air pumping means into the tire cavity responsive to a detected air pressure level within the tire cavity;
  wherein the pressure control assembly comprises a bi-directional air distribution block having a plurality of air pathways, each air pathway coupled to a respective conduit connected to the tire-mounted air pumping means, wherein the plurality of conduits alternatively operating to deliver ambient non-pressurized air to the air pumping means in response to directional tire rotation against a ground surface.

2. The air maintenance tire assembly of claim 1, wherein each of the air pathways comprises a plurality of serial check valves mounted within the block, the check valves within each pathway selectively opening and closing in response to the directional tire rotation against the ground surface.

3. The air maintenance tire assembly of claim 2, wherein the pressure control assembly further comprises a relief valve mounted to vent pressurized air from the plurality of air pathways through the bi-directional block, the relief valve operably opening to vent pressurized air when an air pressure within the tire cavity is at or above the preferred pressure level, and the relief valve operably closing when air pressure within the tire cavity is below the preferred pressure level.

4. The air maintenance tire assembly of claim 1, wherein the pressure control assembly from the control location operably regulates a flow of the non-pressurized ambient air into the tire-mounted air pumping means and controls a flow of the pressurized air from the tire-mounted air pumping means through the valve stem air passageway to the tire cavity.

5. The air maintenance tire assembly of claim 4, further comprising a rim body supporting the tire, wherein the valve stem is sized and configured to extend from the tire through an aperture extending through the rim body supporting the tire and through the bi-directional air distribution block, and wherein the pressure control assembly is mounted to a radially inner-facing surface of the rim body at the control location proximate the valve stem.

6. The air maintenance tire assembly of claim 5, wherein the valve stem houses a primary stem-based control valve within an outward region of the valve stem air passageway for controlling pressurized air entry into the air passageway from an external pressurized air source, the tire-mounted air pumping means comprising a tire-mounted ancillary pressurized maintenance air supply.

7. The air maintenance tire assembly of claim 6, wherein the valve stem passageway comprises at a base location an air collection chamber operably connected to collect pressurized air from the plurality of air pathways through the bi-directional air distribution block and from the stem-based control valve for delivery to the tire cavity.

8. The air maintenance tire assembly of claim 7, wherein the air collection chamber is positioned within the valve stem air passageway in an axial alignment with the stem-based control valve.

9. The air maintenance tire assembly of claim 8, wherein the air pumping means comprises at least one elongate tubular air passageway enclosed within a flexing region of a tire wall, the air passageway having an air inlet portal operable to admit air into the tubular air passageway and an air outlet portal spaced apart from the inlet portal operable to withdraw pressurized air from the tubular air passageway, the air passageway operably closing segment by segment in reaction to induced forces from the tire flexing region as the flexing region of the tire wall rotates opposite a rolling tire footprint.

10. The air maintenance tire assembly of claim 9, wherein the tubular air passageway pumps pressurized air in opposite directions responsive to opposite rotational direction of the tire against the ground surface.

11. An air maintenance tire assembly comprising:
- a tire having a tire cavity bounded by first and second sidewalls extending to a tire tread region;
- a tire-mounted air pumping means for pumping tire-generated pressurized air into the tire cavity to maintain air pressure within the tire cavity at a preferred pressure level;
- a tire having an elongate valve stem projecting outward from the tire cavity, the valve stem having an internal axial valve stem air passageway in communication with the tire cavity operative to direct pressurized air from the valve stem air passageway into the cavity;
- a stem-based valve assembly for operably controlling a flow of pressurized air from an external pressurized air source into the valve stem air passageway;
- a pressure control assembly positioned at a control location proximate the valve stem operative to control a flow of the tire-generated pressurized air from the tire-mounted air pumping means into the tire cavity through the valve stem responsive to a detected air pressure level within the tire cavity;
- wherein the pressure control assembly comprises a bi-directional air distribution block having a plurality of air pathways, each air pathway coupled to a respective conduit connected to the tire-mounted air pumping means, wherein the plurality of conduits alternatively operating to deliver ambient non-pressurized air to the air pumping means in response to directional tire rotation against a ground surface.

12. The air maintenance tire assembly of claim 11, wherein each of the air pathways comprises a plurality of serial check valves mounted within the block, the check valves within each pathway selectively opening and closing in response to the directional tire rotation against the ground surface.

13. The air maintenance tire assembly of claim 12, wherein the pressure control assembly further comprises a relief valve mounted to vent pressurized air from the plurality of air pathways through the bi-directional block, the relief valve operably opening to vent pressurized air when an air pressure within the tire cavity is at or above the preferred pressure level, and the relief valve operably closing when air pressure within the tire cavity is below the preferred pressure level.

14. The air maintenance tire assembly of claim 11, wherein the pressure control assembly from the control location operably regulates a flow of the non-pressurized ambient air into the tire-mounted air pumping means and controls a flow of the pressurized air from the tire-mounted air pumping means through the valve stem air passageway to the tire cavity.

15. The air maintenance tire assembly of claim 14, further comprising a rim body supporting the tire, wherein the valve stem is sized and configured to extend from the tire through an aperture extending through the rim body supporting the tire and through the bi-directional air distribution block; and wherein the pressure control assembly is mounted to a radially inner-facing surface of the rim body at the control location proximate the valve stem.

16. The air maintenance tire assembly of claim 15, wherein the valve stem houses a primary stem-based control valve within an outward region of the valve stem air passageway for controlling pressurized air entry into the air passageway from an external pressurized air source, the tire-mounted air pumping means comprising a tire-mounted ancillary pressurized maintenance air supply.

17. The air maintenance tire assembly of claim 16, wherein the valve stem passageway comprises at a base location an air collection chamber operably connected to collect pressurized air from the plurality of air pathways through the bi-directional air distribution block and from the stem-based control valve for delivery to the tire cavity.

18. The air maintenance tire assembly of claim 17, wherein the air collection chamber is positioned within the valve stem air passageway in an axial alignment with the stem-based control valve.

19. The air maintenance tire assembly of claim 18, wherein the air pumping means comprises at least one elongate tubular air passageway enclosed within a flexing region of a tire wall, the air passageway having an air inlet portal operable to admit air into the tubular air passageway and an air outlet portal spaced apart from the inlet portal operable to withdraw pressurized air from the tubular air passageway, the air passageway operably closing segment by segment in reaction to induced forces from the tire flexing region as the flexing region of the tire wall rotates opposite a rolling tire footprint.

20. The air maintenance tire assembly of claim 19, wherein the tubular air passageway pumps pressurized air in opposite directions responsive to opposite rotational direction of the tire against the ground surface.

* * * * *